(12) United States Patent
Wang et al.

(10) Patent No.: US 9,634,991 B2
(45) Date of Patent: Apr. 25, 2017

(54) METHOD, APPARATUS, HOST, AND NETWORK SYSTEM FOR PROCESSING PACKET

(71) Applicant: Huawei Technologies Co., Ltd., Shenzhen (CN)

(72) Inventors: Yuchen Wang, Beijing (CN); Xueping Wu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 34 days.

(21) Appl. No.: 14/575,592

(22) Filed: Dec. 18, 2014

(65) Prior Publication Data
US 2015/0106913 A1  Apr. 16, 2015

Related U.S. Application Data

(63) Continuation of application No. PCT/CN2012/077304, filed on Jun. 21, 2012.

(51) Int. Cl.
*H04L 29/06* (2006.01)
*H04L 12/46* (2006.01)

(52) U.S. Cl.
CPC ...... *H04L 63/0236* (2013.01); *H04L 12/4625* (2013.01); *H04L 63/0209* (2013.01); *H04L 63/0272* (2013.01)

(58) Field of Classification Search
CPC ....... G06F 21/60; G06F 21/606; H04L 63/02; H04L 63/0209; H04L 63/0236; H04L 63/0272; H04L 12/4625
See application file for complete search history.

(56) References Cited

U.S. PATENT DOCUMENTS 7,447,203 B2   11/2008  Chen et al.
7,756,843 B1 *  7/2010  Palmer .............. G06F 17/30864
                                                         707/694
(Continued)

FOREIGN PATENT DOCUMENTS

CN   101668022 A   3/2010
CN   101739282 A   6/2010
(Continued)

OTHER PUBLICATIONS

Wu et al., "Network Security for Virtual Machine in Cloud Computing", 2010, pp. 18-21.*
(Continued)

*Primary Examiner* — Jason Lee
*Assistant Examiner* — Thaddeus Plecha
(74) *Attorney, Agent, or Firm* — Conley Rose, P.C.

(57) ABSTRACT

A method, an apparatus, a host, and a network system for processing a packet. The method includes receiving, by a physical host through a virtual bridge in the physical host, a network packet sent by a source virtual machine in the physical host, where the network packet carries a source media access control (MAC) address and a target MAC address; obtaining, by the physical host according to the source MAC address and the target MAC address by querying correspondence between each virtual machine MAC address and a security domain, a security domain to which the source virtual machine corresponds and a security domain to which a target virtual machine corresponds; and controlling, by the physical host, the virtual bridge to discard the network packet, when the security domain to which the source virtual machine corresponds is different from a security domain corresponding to the virtual bridge.

20 Claims, 14 Drawing Sheets

---

A physical host receives, through a virtual bridge in the physical host, a network packet sent by a source virtual machine in the physical host, where the network packet carries a source MAC address and a target MAC address —101

The physical host obtains, according to the source MAC address and the target MAC address by querying correspondence between each virtual machine MAC address and a security domain, a security domain to which the source virtual machine corresponds and a security domain to which the target virtual machine corresponds —102

The physical host controls the virtual bridge to discard the network packet, when the security domain to which the source virtual machine corresponds is different from a security domain corresponding to the virtual bridge —103

(56) References Cited

U.S. PATENT DOCUMENTS

| | | | |
|---|---|---|---|
| 9,021,547 B1* | 4/2015 | Lin | H04L 63/20 713/151 |
| 2003/0065944 A1 | 4/2003 | Mao et al. | |
| 2008/0104661 A1* | 5/2008 | Levin | G06F 21/6218 726/1 |
| 2009/0178129 A1* | 7/2009 | Cross | H04L 9/3213 726/10 |
| 2010/0067374 A1 | 3/2010 | Elangovan et al. | |
| 2010/0177778 A1* | 7/2010 | Dobbins | H04L 12/1886 370/395.53 |
| 2013/0136126 A1* | 5/2013 | Wang | H04L 61/103 370/392 |
| 2013/0223287 A1* | 8/2013 | Ahmad | H04L 12/465 370/255 |
| 2013/0301425 A1* | 11/2013 | Udutha | H04L 12/4641 370/242 |
| 2013/0315252 A1* | 11/2013 | Emmadi | H04L 12/4641 370/395.53 |

FOREIGN PATENT DOCUMENTS

| | | |
|---|---|---|
| CN | 101951384 A | 1/2011 |
| CN | 102150399 A | 8/2011 |
| EP | 2413549 A1 | 2/2012 |

OTHER PUBLICATIONS

Foreign Communication From a Counterpart Application, European Application No. 12879232.2, Extended European Search Report dated Apr. 30, 2015, 6 pages.

Partial English Translation and Abstract of Chinese Patent Application No. CN101668022A, Apr. 10, 2015, 5 pages.

Foreign Communication From a Counterpart Application, PCT Application No. PCT/CN2012/077304, English Translation of International Search Report dated Mar. 21, 2013, 2 pages.

Foreign Communication From a Counterpart Application, PCT Application No. PCT/CN2012/077304, English Translation of Written Opinion dated Mar. 21, 2013, 6 pages.

Weiping, Y., et al., "Network-based Intrusion Detection System for Virtual Machine," Huazhong University of Science and Technology, May 2008, 62 pages.

Foreign Communication From a Counterpart Application, Chinese Application No. 201280000583.7, Chinese Office Action dated Aug. 12, 2015, 5 pages.

Foreign Communication From A Counterpart Application, European Application No. 12879232.2, European Office Action dated Jan. 26, 2017, 6 pages.

* cited by examiner

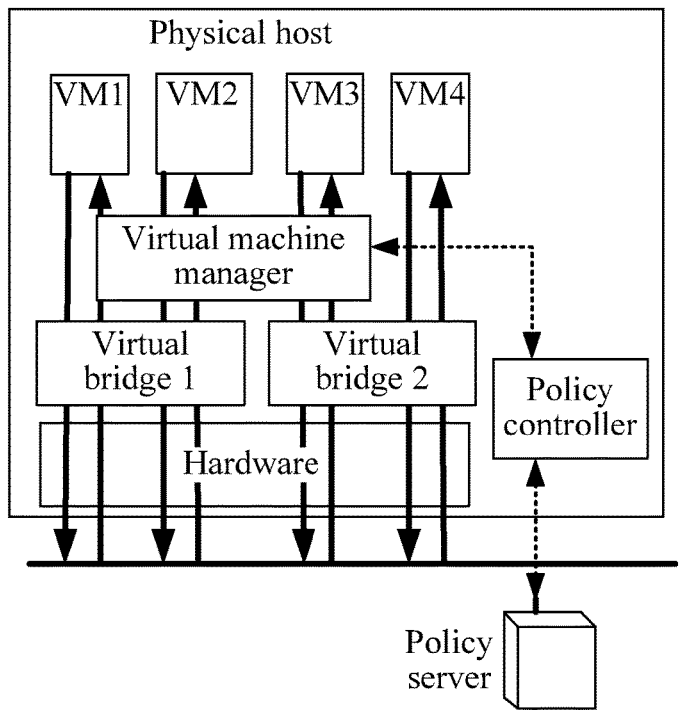

FIG. 1A

| A physical host receives, through a virtual bridge in the physical host, a network packet sent by a source virtual machine in the physical host, where the network packet carries a source MAC address and a target MAC address | 101 |

| The physical host obtains, according to the source MAC address and the target MAC address by querying correspondence between each virtual machine MAC address and a security domain, a security domain to which the source virtual machine corresponds and a security domain to which the target virtual machine corresponds | 102 |

| The physical host controls the virtual bridge to discard the network packet, when the security domain to which the source virtual machine corresponds is different from a security domain corresponding to the virtual bridge | 103 |

FIG. 1B

METHOD, APPARATUS, HOST, AND NETWORK SYSTEM FOR PROCESSING PACKET

CROSS-REFERENCE TO RELATED APPLICATIONS

This application is a continuation in of International Application No. PCT/CN2012/077304, filed on Jun. 21, 2012, which is hereby incorporated by reference in its entirety.

TECHNICAL FIELD

The present invention relates to communications technologies, and in particular, to a method, an apparatus, a host, and a network system for processing a packet.

BACKGROUND

In a data center, service systems of different users all have their own infrastructures such as computers and networks, and the infrastructures of the different service systems are independent from each other. Therefore, information isolation between the service systems can be ensured by means of network physical isolation, so as to avoid information leakage of the service systems. For example, a computer and a network of a financial system are isolated from those of other service systems, thereby ensuring that users in the other service systems cannot steal data in the financial system via the network.

Virtualization refers to that computer elements are run on a virtual basis rather than an actual basis. In a central processing unit (CPU) virtualization technology, a single CPU may simulate multiple CPUs running in parallel, one platform is allowed to run multiple operation systems, and applications can be run in mutually independent spaces without interference with each other, thereby significantly improving working efficiency of a computer. Due to the advantage of virtualization technologies in improving working efficiency, the applying the virtualization technologies to the data center becomes a research hotspot of the prior art. However, after virtualization of the data center, a machine for running user services is no longer a physical computer but a virtual machine (VM) installed in the physical computer, different virtual machines belonging to different tenants may be run in the same physical host, and different service systems formed of virtual machines share the same network infrastructure. In this case, it is difficult to implement isolation of the information systems. For example, if a financial system and a research and development (R&D) system use different virtual machines, but the different virtual machines are run in the same physical host or in the same network, a user may steal the data in the financial system by means of address fraud, network interception, or the like through the virtual machine in the R&D system. Therefore, when different tenants share the physical infrastructure, how to divide the virtual machines into different virtual networks across a physical boundary and ensure information isolation between the virtual networks becomes a basic requirement in ensuring security for multiple tenants in the virtualized data center.

In the prior art, to ensure information isolation between virtual networks, generally, network traffic of the virtual machine is enabled to pass through a switch, that is, all traffic generated by the virtual machine in the physical host is sent to the switch outside the physical host, filtering control processing is performed on the traffic by the switch, and the switch performs processing on the traffic from the virtual machine like processing traffic of an ordinary host, thereby isolating the virtual machine using an existing virtual local area network (VLAN) technology.

However, in the prior art, all traffic for communication between the virtual machines is conducted to the switch for processing, which greatly aggravates the burden of the switch.

SUMMARY

The present invention provides a method, an apparatus, a host, and a network system for processing a packet, so as to ease the burden of a physical switch and improve communication efficiency of a virtual network.

In a first aspect, a method for processing a packet is provided, including receiving, by a physical host through a virtual bridge in the physical host, a network packet sent by a source virtual machine in the physical host, where the network packet carries a source media access control (MAC) address and a target MAC address; obtaining, by the physical host according to the source MAC address and the target MAC address by querying correspondence between each virtual machine MAC address and a security domain, a security domain to which the source virtual machine corresponds and a security domain to which a target virtual machine corresponds; and controlling, by the physical host, the virtual bridge to discard the network packet, when the security domain to which the source virtual machine corresponds is different from a security domain corresponding to the virtual bridge.

In a first possible implementation manner of the first aspect, the controlling, by the physical host, the virtual bridge to discard the network packet, when the security domain to which the source virtual machine corresponds is different from the security domain corresponding to the virtual bridge includes, when the target MAC address is a non-broadcast address, if the security domain to which the source virtual machine corresponds is the same as the security domain corresponding to the virtual bridge, and the security domain to which the target virtual machine corresponds is also the same as the security domain corresponding to the virtual bridge, controlling the virtual bridge to send the network packet according to the target MAC address; and if the security domain to which the source virtual machine corresponds is different from the security domain corresponding to the virtual bridge, or the security domain to which the target virtual machine corresponds is different from the security domain corresponding to the virtual bridge, controlling the virtual bridge to discard the network packet.

With reference to the first possible implementation manner of the first aspect, in a second possible implementation manner, the controlling the virtual bridge to send the network packet according to the target MAC address includes, when the target virtual machine and the source virtual machine are located in the same physical host, controlling the virtual bridge to directly send the network packet to the target virtual machine in the physical host according to the target MAC address; and when the target virtual machine and the source virtual machine are not located in the same physical host, controlling the virtual bridge to send the network packet to a physical switch, where the physical switch forwards the network packet.

In a third possible implementation manner of the first aspect, the controlling, by the physical host, the virtual bridge to discard the network packet, when the security domain to which the source virtual machine corresponds is different from the security domain corresponding to the virtual bridge includes, when the target MAC address is a broadcast address, if the security domain to which the source virtual machine corresponds is the same as the security domain corresponding to the virtual bridge, controlling the virtual bridge to broadcast the network packet in a local area network through a physical switch; and if the security domain to which the source virtual machine corresponds is different from the security domain corresponding to the virtual bridge, controlling the virtual bridge to discard the network packet.

With reference to the first aspect, the first possible implementation manner of the first aspect, the second possible implementation manner of the first aspect, or the third possible implementation manner of the first aspect, in a fourth implementation manner of the first aspect, before the obtaining, by querying the correspondence between each virtual machine MAC address and the security domain, the security domain to which the source virtual machine corresponds and the security domain to which the target virtual machine corresponds, the method further includes reporting, by the physical host, a MAC group policy of the physical host to a policy server, where the MAC group policy includes correspondence between a virtual machine MAC address in the physical host and a security domain; and obtaining, by the physical host, a MAC group policy in a local area network from the policy server in a network where the physical host is located, where the MAC group policy in the local area network includes the correspondence between each virtual machine MAC address and the security domain.

With reference to the fourth implementation manner of the first aspect, in a fifth implementation manner of the first aspect, after the reporting, by the physical host, the MAC group policy of the physical host to the policy server, the method further includes, when the physical host detects that the MAC group policy of the physical host is changed, reporting the changed MAC group policy to the policy server, where the policy server updates the MAC group policy in the local area network.

In a second aspect, another method for processing a packet is provided, including receiving, by a physical host through a virtual bridge in the physical host, a network packet forwarded by a physical switch, where the network packet is sent to a target virtual machine in the physical host by a source virtual machine in another physical host, and carries a source MAC address and a target MAC address; obtaining, by the physical host according to the source MAC address and the target MAC address by querying correspondence between each virtual machine MAC address and a security domain, a security domain to which the source virtual machine corresponds and a security domain to which the target virtual machine corresponds; and controlling, by the physical host, the virtual bridge to discard the network packet, when the security domain to which the source virtual machine corresponds is different from a security domain corresponding to the virtual bridge.

In a first possible implementation manner of the second aspect, the controlling, by the physical host, the virtual bridge to discard the network packet, when the security domain to which the source virtual machine corresponds is different from the security domain corresponding to the virtual bridge includes, when the target MAC address is a non-broadcast address, if the security domain to which the source virtual machine corresponds is the same as the security domain corresponding to the virtual bridge, and the security domain to which the target virtual machine corresponds is also the same as the security domain corresponding to the virtual bridge, controlling the virtual bridge to send the network packet to the target virtual machine in the physical host according to the target MAC address; and if the security domain to which the source virtual machine corresponds is different from the security domain corresponding to the virtual bridge, or the security domain to which the target virtual machine corresponds is different from the security domain corresponding to the virtual bridge, controlling the virtual bridge to discard the network packet.

In a second possible implementation manner of the second aspect, the controlling, by the physical host, the virtual bridge to discard the network packet, when the security domain to which the source virtual machine corresponds is different from the security domain corresponding to the virtual bridge includes, when the target MAC address is a broadcast address, if the security domain corresponding to the virtual bridge is the same as the security domain to which the source virtual machine corresponds, controlling the virtual bridge to forward the network packet to all virtual machines mapped onto the virtual bridge; and if the security domain corresponding to the virtual bridge is different from the security domain to which the source virtual machine corresponds, controlling the virtual bridge to discard the network packet.

In a third aspect, an apparatus for processing a packet is provided, including a first policy obtaining module configured to obtain correspondence between each virtual machine MAC address and a security domain; a first receiving module configured to receive, through a virtual bridge in a physical host, a network packet sent by a source virtual machine in the physical host, where the network packet carries a source MAC address and a target MAC address; a first obtaining module configured to obtain, according to the source MAC address and the target MAC address that are carried in the network packet received by the first receiving module, and by querying from the correspondence between each virtual machine MAC address and the security domain that is obtained by the first policy obtaining module, a security domain to which the source virtual machine corresponds and a security domain to which a target virtual machine corresponds; and a first sending control module configured to, when the security domain to which the source virtual machine corresponds and which is obtained by the first obtaining module is different from the security domain corresponding to the virtual bridge, control the virtual bridge to discard the network packet.

In a first possible implementation manner of the third aspect, the first sending control module includes a first sending unit configured to, when the target MAC address is a non-broadcast address, if the security domain to which the source virtual machine corresponds and which is obtained by the first obtaining module is the same as the security domain corresponding to the virtual bridge, and the security domain to which the target virtual machine corresponds and which is obtained by the first obtaining module is the same as the security domain corresponding to the virtual bridge, control the virtual bridge to send the network packet according to the target MAC address; and a first discarding unit configured to, when the target MAC address is a non-broadcast address, if the security domain to which the source virtual machine corresponds and which is obtained by the first obtaining module is different from the security domain corresponding to the virtual bridge, or the security domain to which the target virtual machine corresponds and which is obtained by the first obtaining module is different from the security domain corresponding to the virtual bridge, control the virtual bridge to discard the network packet.

With reference to the first possible implementation manner of the third aspect, in a second implementation manner of the third aspect, the first sending unit includes a sending sub-unit configured to, when the target MAC address is a non-broadcast address, if the security domain to which the source virtual machine corresponds and which is obtained by the first obtaining module is the same as the security domain corresponding to the virtual bridge, the security domain to which the target virtual machine corresponds and which is obtained by the first obtaining module is also the same as the security domain corresponding to the virtual bridge, and the target virtual machine and the source virtual machine are located in the same physical host, control the virtual bridge to send the network packet to the target virtual machine in the physical host according to the target MAC address; and a forwarding sub-unit configured to, when the target virtual machine and the source virtual machine are not located in the same physical host, control the virtual bridge to send the network packet to a physical switch, where the physical switch forwards the network packet.

In a third possible implementation manner of the third aspect, the first sending control module includes a first broadcast unit configured to, when the target MAC address is a broadcast address, if the security domain to which the source virtual machine corresponds and which is obtained by the first obtaining module is the same as the security domain corresponding to the virtual bridge, control the virtual bridge to broadcast the network packet in a local area network through a physical switch; and a second discarding unit configured to, when the target MAC address is a broadcast address, if the security domain to which the source virtual machine corresponds and which is obtained by the first obtaining module is different from the security domain corresponding to the virtual bridge, control the virtual bridge to discard the network packet.

In a fourth aspect, an apparatus for processing a packet is provided, including a second policy obtaining module configured to obtain correspondence between each virtual machine MAC address and a security domain; a second receiving module configured to receive, through a virtual bridge in a physical host, a network packet forwarded by a physical switch, where the network packet is sent to a target virtual machine in the physical host by a source virtual machine in another physical host, and carries a source MAC address and a target MAC address; a second obtaining module configured to obtain, according to the source MAC address and the target MAC address that are carried in the network packet received by the second receiving module, and by querying the correspondence between each virtual machine MAC address and the security domain that is obtained by the second policy obtaining module, a security domain to which the source virtual machine corresponds and a security domain to which the target virtual machine corresponds; and a second sending control module configured to, when the security domain to which the source virtual machine corresponds and which is obtained by the second obtaining module is different from the security domain corresponding to the virtual bridge, control the virtual bridge to discard the network packet.

In a first possible implementation manner of the fourth aspect, the second sending control module includes a second sending unit configured to, when the target MAC address is a non-broadcast address, if the security domain to which the source virtual machine corresponds and which is obtained by the second obtaining module is the same as the security domain corresponding to the virtual bridge, and the security domain to which the target virtual machine corresponds and which is obtained by the second obtaining module is the same as the security domain corresponding to the virtual bridge, control the virtual bridge to send the network packet to the target virtual machine in the physical host according to the target MAC address; and a third discarding unit configured to, when the target MAC address is a non-broadcast address, if the security domain to which the source virtual machine corresponds and which is obtained by the second obtaining module is different from the security domain corresponding to the virtual bridge, or the security domain to which the target virtual machine corresponds and which is obtained by the second obtaining module is different from the security domain corresponding to the virtual bridge, control the virtual bridge to discard the network packet.

In a second possible implementation manner of the fourth aspect, the second sending control module includes a second broadcast unit configured to, when the target MAC address is a broadcast address, if the security domain corresponding to the virtual bridge that is obtained by the second obtaining module is the same as the security domain to which the source virtual machine corresponds, control the virtual bridge to forward the network packet to all virtual machines mapped onto the virtual bridge; and a fourth discarding unit configured to, when the target MAC address is a broadcast address, if the security domain corresponding to the virtual bridge that is obtained by the second obtaining module is different from the security domain to which the source virtual machine corresponds, control the virtual bridge to discard the network packet.

In a fifth aspect, a source host is provided, including a processor, and further including a virtual bridge and a policy controller, where the policy controller is configured to obtain correspondence between each virtual machine MAC address and a security domain from a policy server in a network where the policy controller is located; the virtual bridge is configured to receive a network packet sent by a source virtual machine in the host, where the network packet carries a source MAC address and a target MAC address; and the processor is configured to obtain, according to the source MAC address and the target MAC address by querying the correspondence between each virtual machine MAC address and the security domain that is obtained by the policy controller, a security domain to which the source virtual machine corresponds and a security domain to which a target virtual machine corresponds; and control the virtual bridge to discard the network packet, when the security domain to which the source virtual machine corresponds is different from a security domain corresponding to the virtual bridge.

In a first possible implementation manner of the fifth aspect, the processor is configured to obtain, according to the source MAC address and the target MAC address by querying the correspondence between each virtual machine MAC address and the security domain that is obtained by the policy controller, the security domain to which the source virtual machine corresponds and the security domain to which the target virtual machine corresponds; when the target MAC address is a non-broadcast address, if the security domain to which the source virtual machine corresponds is the same as a security domain corresponding to the virtual bridge and the security domain to which the target virtual machine corresponds is also the same as the security domain corresponding to the virtual bridge, control the virtual bridge to send the network packet according to the target MAC address; and if the security domain to which the source virtual machine corresponds is different from the security domain corresponding to the virtual bridge, or the security domain to which the target virtual machine corresponds is different from the security domain corresponding to the virtual bridge, control the virtual bridge to discard the network packet.

In a second possible implementation manner of the fifth aspect, the processor is configured to obtain, according to the source MAC address and the target MAC address by querying the correspondence between each virtual machine MAC address and the security domain that is obtained by the policy controller, the security domain to which the source virtual machine corresponds and the security domain to which the target virtual machine corresponds; when the target MAC address is a broadcast address, if the security domain to which the source virtual machine corresponds is the same as a security domain corresponding to the virtual bridge, control the virtual bridge to broadcast the network packet in a local area network through a physical switch; and if the security domain to which the source virtual machine corresponds is different from a security domain corresponding to the virtual bridge, control the virtual bridge to discard the network packet.

In a sixth aspect, a target host is provided, including a processor, and further including a virtual bridge and a policy controller, where the policy controller is configured to obtain correspondence between each virtual machine MAC address and a security domain from a policy server in a network where the policy controller is located; the virtual bridge is configured to receive a network packet forwarded by a physical switch, where the network packet is sent to a target virtual machine in the physical host by a source virtual machine in another physical host, and carries a source MAC address and a target MAC address; and the processor is configured to obtain, according to the source MAC address and the target MAC address by querying the correspondence between each virtual machine MAC address and the security domain that is obtained by the policy controller, a security domain to which the source virtual machine corresponds and a security domain to which the target virtual machine corresponds; and control the virtual bridge to discard the network packet, when the security domain to which the source virtual machine corresponds is different from a security domain corresponding to the virtual bridge.

In a first possible implementation manner of the sixth aspect, the processor is configured to obtain, according to the source MAC address and the target MAC address by querying the correspondence between each virtual machine MAC address and the security domain, the security domain to which the source virtual machine corresponds and the security domain to which the target virtual machine corresponds; when the target MAC address is a non-broadcast address, if the security domain to which the source virtual machine corresponds is the same as a security domain corresponding to the virtual bridge and the security domain to which the target virtual machine corresponds is also the same as the security domain corresponding to the virtual bridge, control the virtual bridge to send the network packet to the target virtual machine according to the target MAC address; and if the security domain to which the source virtual machine corresponds is different from the security domain corresponding to the virtual bridge, or the security domain to which the target virtual machine corresponds is different from the security domain corresponding to the virtual bridge, control the virtual bridge to discard the network packet.

In a second possible implementation manner of the sixth aspect, the processor is configured to obtain, according to the source MAC address and the target MAC address by querying the correspondence between each virtual machine MAC address and the security domain, the security domain to which the source virtual machine corresponds and the security domain to which the target virtual machine corresponds; when the target MAC address is a broadcast address, if the security domain corresponding to the virtual bridge is the same as the security domain to which the source virtual machine corresponds, control the virtual bridge to forward the network packet to all virtual machines mapped onto the virtual bridge; and if the security domain corresponding to the virtual bridge is different from the security domain to which the source virtual machine corresponds, control the virtual bridge to discard the network packet.

In a seventh aspect, a network system is provided, including the source host, the target host, and the policy server, where the policy server is configured to provide correspondence between each virtual machine MAC address and a security domain for a policy controller in the host.

In a first implementation manner of the seventh aspect, the policy server is further configured to receive a MAC group policy of the host reported by the host through the policy controller, where the MAC group policy includes the correspondence between each virtual machine MAC address and the security domain; and update, according to the MAC group policy, local correspondence between each virtual machine MAC address and the security domain.

The technical effects of the embodiments of the present invention are as follows: a physical host receives, through a virtual bridge, a network packet sent by a source virtual machine to a target virtual machine; obtains, according to a source MAC address and a target MAC address by querying correspondence between a virtual machine MAC address and a security domain, a security domain to which the source virtual machine corresponds and a security domain to which the target virtual machine corresponds; and controls the virtual bridge to discard the network packet, when the security domain to which the source virtual machine corresponds is different from a security domain corresponding to the virtual bridge. In the embodiments, filtering control on the network packet is implemented through the virtual bridge, and it is not required to send all traffic between virtual machines to a physical switch for processing, thereby greatly easing the burden of the physical switch and improving communication efficiency of a virtual network.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and persons of ordinary skill in the art may still derive other drawings from these accompanying drawings without creative efforts.

FIG. 1A is a schematic application diagram of a first embodiment of a method for processing a packet according to the present invention;

FIG. 1B is a flow chart of the first embodiment of the method for processing a packet according to the present invention;

DESCRIPTION OF EMBODIMENTS

Figure 2:
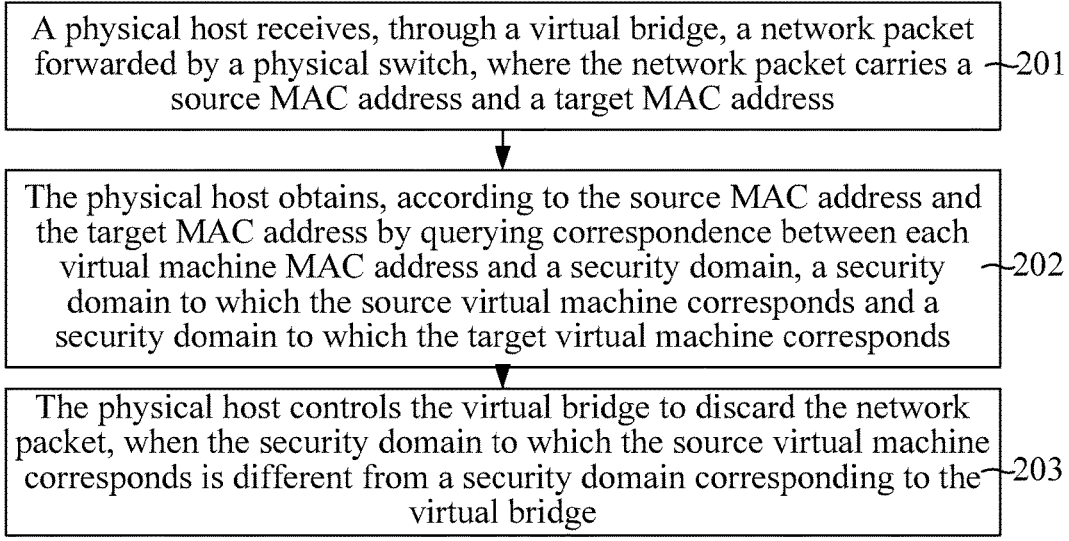
FIG. 2 is a flow chart of a second embodiment of a method for processing a packet according to the present invention.

To make the objectives, technical solutions, and advantages of the embodiments of the present invention clearer, the following clearly and completely describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention shall fall within the protection scope of the present invention.

For ease of understanding, FIG. 1A is a schematic application diagram of a first embodiment of a method for processing a packet according to the present invention. A physical host in FIG. 1A may be a physical host (that is, a source host) where a source virtual machine sending a network packet is located, and may also be a physical host (that is, a target host) where a target virtual machine of the network packet is located. The embodiment of the method for processing a packet of the present invention will be described below with reference to FIG. 1A.

FIG. 1B is a flow chart of the first embodiment of the method for processing a packet according to the present invention. As shown in FIG. 1B, this embodiment provides a method for processing a packet, in which a solution of the present invention is described in the aspect of a physical host where a source virtual machine is located. The method for processing a packet provided by this embodiment may include the following steps.

Step 101: A physical host receives, through a virtual bridge in the physical host, a network packet sent by a source virtual machine in the physical host, where the network packet carries a source MAC address and a target MAC address.

A receiver of the network packet may be another virtual machine in the physical host, and may also be a virtual machine in another physical host.

Optionally, in a specific implementation manner of this embodiment, a communication isolator is set in an operation system (OS) of a physical host (HOST) where a virtual machine is installed or in a virtual machine manager (Hypervisor) for running a virtual machine, where the communication isolator may be implemented in a software manner, such as network communication isolation software. One policy controller and at least one virtual bridge (VB) are set and managed through the network communication isolation software. The virtual bridge implements functions (such as, implementing relay in a link layer, forwarding the network packet, and isolating collision) similar to those of a physical bridge using software. In this embodiment, one virtual bridge corresponds to one security domain, and a virtual network card of a virtual machine installed in the physical host is mapped onto one virtual bridge of the physical host, where a security domain to which the virtual machine corresponds is the same as a security domain corresponding to the mapped virtual bridge, thereby establishing correspondence between a virtual machine MAC address and the security domain. The security domain refers to a set of computers (which may be physical hosts, and may also be virtual machines) trusting each other and capable of communicating with each other. When a virtual machine is installed in the physical host, the network communication isolation software provides one option list for a user, where each option in the option list corresponds to a security domain, and the network communication isolation software receives a selection result of the user, so that a MAC address of the installed virtual machine is mapped onto a virtual bridge corresponding to a selected security domain.

Optionally, after the physical host establishes correspondence between a virtual machine MAC address in the local physical host and a security domain, the communication isolator reports, through a policy controller, a MAC group policy that contains the correspondence between the virtual machine MAC address in the physical host and the security domain to a policy server in a network where the physical host is located, and may also obtain, through the policy controller, correspondence between a virtual machine MAC address in another physical host and a security domain. Through the foregoing mechanism, a policy controller in each physical host can share correspondence between each virtual machine MAC address and the security domain, so as to subsequently determine how to send the packet. In this embodiment, when a source virtual machine sends a network packet to a target virtual machine, because a virtual network card of each virtual machine in the virtual local area network is mapped onto the physical host where the virtual machine is located and onto a virtual bridge corresponding to a security domain to which each virtual machine corresponds, packets sent by virtual machines are all first captured by virtual bridges corresponding to the virtual machines. In this step, the physical host receives, through the virtual bridge in the physical host, the network packet sent by the source virtual machine to the target virtual machine, where the physical host is a physical host where the source virtual machine is located; and when the source virtual machine sends the network packet to the target virtual machine, the network packet carries a source MAC address and a target MAC address of the network packet. A virtual bridge corresponding to the source virtual machine is a virtual bridge corresponding to a security domain to which the source virtual machine corresponds, the source MAC address is a MAC address of the source virtual machine, and the target MAC address is a MAC address of the target virtual machine.

Step 102: The physical host obtains, according to the source MAC address and the target MAC address by querying correspondence between each virtual machine MAC address and a security domain, a security domain to which the source virtual machine corresponds and a security domain to which the target virtual machine corresponds.

In this embodiment, a MAC group policy of a local area network may be stored in a policy server, and a policy controller may obtain the MAC group policy from the policy server. The MAC group policy may be correspondence between each virtual machine MAC address and a security domain in the local area network. By setting the MAC group policy, the local area network may be divided into multiple security domains, and a virtual network card of a virtual machine belonging to the same security domain is mapped onto a virtual bridge corresponding to the security domain. The policy server may be set on an independent server device in a layer-2 network. When the physical host receives a network packet through a virtual bridge, the communication isolator needs to determine whether to send or discard the network packet. In this step, the communication isolator in the physical host obtains, through the policy controller and from the policy server, the MAC group policy of the virtual local area network that contains the correspondence between each virtual machine MAC address and the security domain; and obtains, according to the source MAC address and the target MAC address in the network packet by querying the correspondence between each virtual machine MAC address and the security domain, the security domain to which the source virtual machine corresponds and the security domain to which the target virtual machine corresponds. After receiving the network packet, the physical host first obtains, according to the source MAC address by querying the correspondence between each virtual machine MAC address and the security domain, the security domain to which the source virtual machine corresponds; and then obtains, according to the target MAC address by querying the correspondence between each virtual machine MAC address and the security domain, the security domain to which the target virtual machine corresponds.

Step 103: The physical host controls the virtual bridge to discard the network packet, when the security domain to which the source virtual machine corresponds is different from a security domain corresponding to the virtual bridge.

After obtaining the security domain to which the source virtual machine corresponds and the security domain to which the target virtual machine corresponds, the physical host controls, according to the security domain to which the source virtual machine corresponds, the security domain to which the target virtual machine corresponds, and the security domain corresponding to the virtual bridge, the virtual bridge to perform specific sending control processing on the received network packet, where the sending control processing herein is forwarding the network packet to the target virtual machine or a physical switch, or not sending the network packet, that is, blocking the network packet and performing discarding processing on the packet. When the security domain to which the source virtual machine corresponds is different from the security domain corresponding to the virtual bridge, the communication isolator controls the virtual bridge to discard the network packet. The security domain corresponding to the virtual bridge may be obtained according to preset correspondence between a virtual bridge in the physical host and a security domain. It can be seen from the above that, in this embodiment, filtering control on the network packet is implemented through the virtual bridge, it is not required to send all traffic between virtual machines to the physical switch for processing, and even if the network packet is forwarded to the physical switch, the network packet merely needs to be forwarded without filtering control, thereby greatly easing the burden of the physical switch.

This embodiment provides a method for processing a packet, where a physical host receives, through a virtual bridge, a network packet sent by a source virtual machine to a target virtual machine; obtains, according to a source MAC address and a target MAC address by querying correspondence between each virtual machine MAC address and a security domain, a security domain to which the source virtual machine corresponds and a security domain to which the target virtual machine corresponds; and controls the virtual bridge to discard the network packet, when the security domain to which the source virtual machine corresponds is different from a security domain corresponding to the virtual bridge. In this embodiment, filtering control on the network packet is implemented through the virtual bridge, and it is not required to send all traffic between virtual machines to a physical switch for processing, thereby greatly easing the burden of the physical switch and improving communication efficiency of a virtual network.

FIG. 2 is a flow chart of a second embodiment of a method for processing a packet according to the present invention. As shown in FIG. 2, this embodiment provides a method for processing a packet, in which a solution of the present invention is described in the aspect of a physical host where a target virtual machine is located. The method for processing a packet provided by this embodiment may include the following steps.

Step 201: A physical host receives, through a virtual bridge, a network packet forwarded by a physical switch, where the network packet carries a source MAC address and a target MAC address.

In this embodiment, when a source virtual machine and a target virtual machine are not located in the same physical host, after filtering control is performed, a virtual bridge corresponding to the source virtual machine, through the physical switch, sends the network packet to the physical host where the target virtual machine is located. In this step, the physical host receives, through the virtual bridge, the network packet forwarded by the physical switch, where the network packet is sent to the target virtual machine in the physical host by the source virtual machine in another physical host, the physical host herein is the physical host where the target virtual machine is located, the virtual bridge is a virtual bridge corresponding to a security domain to which the target virtual machine corresponds, and the network packet carries the source MAC address and the target MAC address of the network packet. The source MAC address is a MAC address of the source virtual machine, and the target MAC address is a MAC address of the target virtual machine.

Step 202: The physical host obtains, according to the source MAC address and the target MAC address by querying correspondence between each virtual machine MAC address and a security domain, a security domain to which the source virtual machine corresponds and a security domain to which the target virtual machine corresponds.

When receiving the network packet, the physical host where the target virtual machine is located also needs to perform forwarding control processing on the network packet. In this step, the physical host where the target virtual machine is located obtains, according to the source MAC address and the target MAC address by querying the correspondence between each virtual machine MAC address and the security domain that is obtained by a policy controller, the security domain to which the source virtual machine corresponds and the security domain to which the target virtual machine corresponds. After the physical host where the target virtual machine is located receives the network packet, a communication isolator first obtains, according to the source MAC address by querying the correspondence between each MAC address and the security domain, the security domain to which the source virtual machine corresponds; and then obtains, according to the target MAC address by querying the correspondence between each MAC address and the security domain, the security domain to which the target virtual machine belongs.

Optionally, similar to the first embodiment, the physical host obtains, through the policy controller, a MAC group policy of a virtual local area network from the policy server in a network where the physical host is located, where the MAC group policy of the virtual local area network includes correspondence between each MAC address and the security domain.

Step 203: The physical host controls the virtual bridge to discard the network packet, when the security domain to which the source virtual machine corresponds is different from a security domain corresponding to the virtual bridge.

After obtaining the security domain corresponding to the source virtual machine and the security domain to which the target virtual machine corresponds, the physical host controls, according to the security domain to which the source virtual machine corresponds, the security domain to which the target virtual machine corresponds, and the security domain corresponding to the virtual bridge receiving the network packet, the virtual bridge to perform specific sending control processing on the received network packet, where the sending control processing herein is sending the network packet to a virtual machine mapped onto the virtual bridge, or not sending the network packet, that is, blocking the packet and performing discarding processing on the packet. In this step, when the security domain to which the source virtual machine corresponds is different from the security domain corresponding to the virtual bridge, the communication isolator in the physical host controls the virtual bridge to discard the network packet, so as to implement dual filtering on the network packet and ensure security of the virtual local area network.

This embodiment provides a method for processing a packet, where a physical host receives, through a virtual bridge corresponding to a target virtual machine, a network packet sent by a source virtual machine to a target virtual machine and forwarded by a physical switch; obtains, according to a source MAC address and a target MAC address by querying correspondence between each virtual machine MAC address and a security domain, a security domain to which the source virtual machine corresponds and a security domain to which the target virtual machine corresponds; and controls the virtual bridge to discard the network packet, when the security domain to which the source virtual machine corresponds is different from a security domain corresponding to the virtual bridge. In this embodiment, filtering control on the network packet is implemented through the virtual bridge, and it is not required to send all traffic between virtual machines to the physical switch for processing, thereby greatly easing the burden of the physical switch and improving communication efficiency of a virtual network.

Figure 3A:
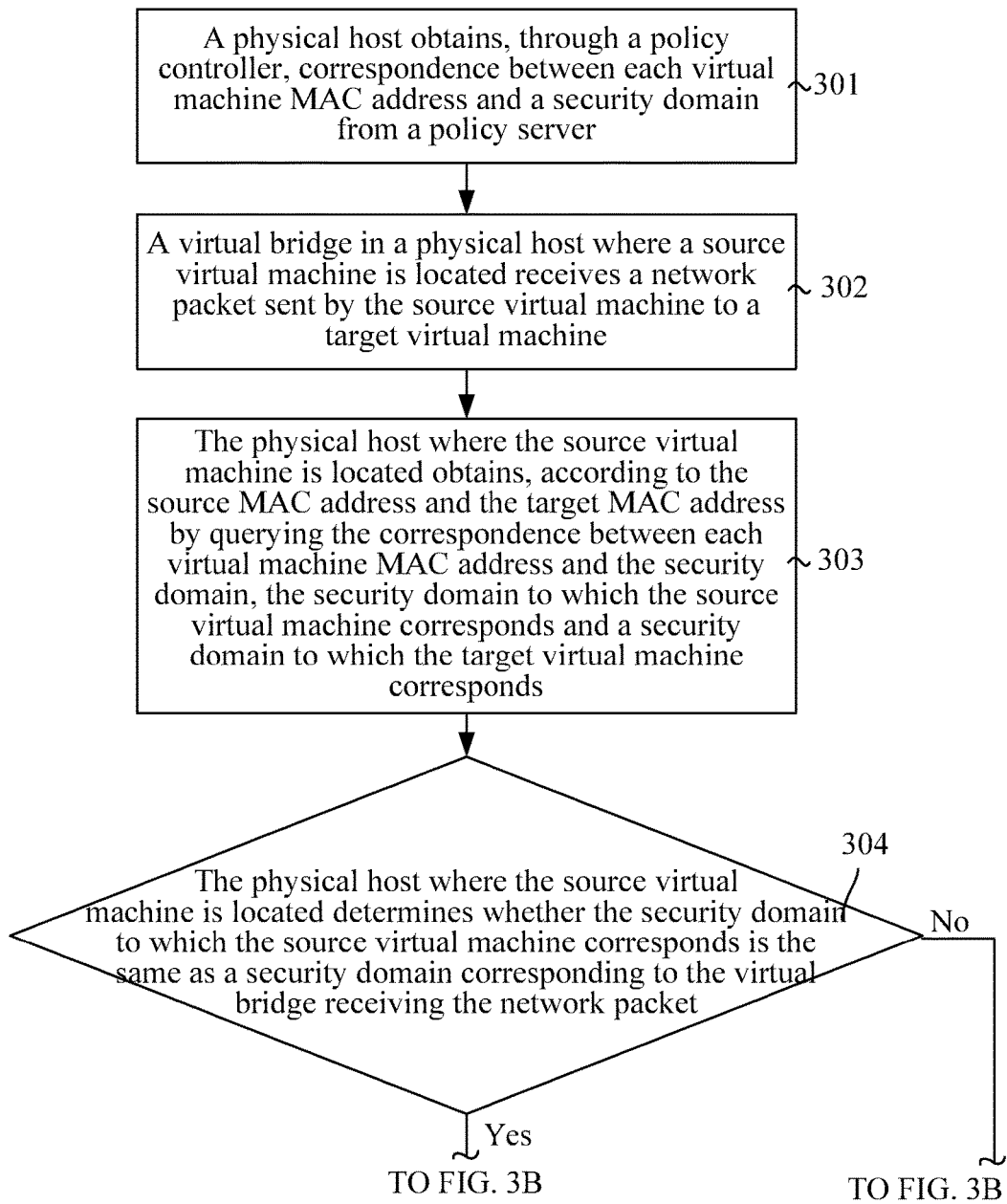
FIG. 3A, FIG. 3B and FIG. 3C together form a flow chart of a third embodiment of a method for processing a packet according to the present invention.
Figure 3B:
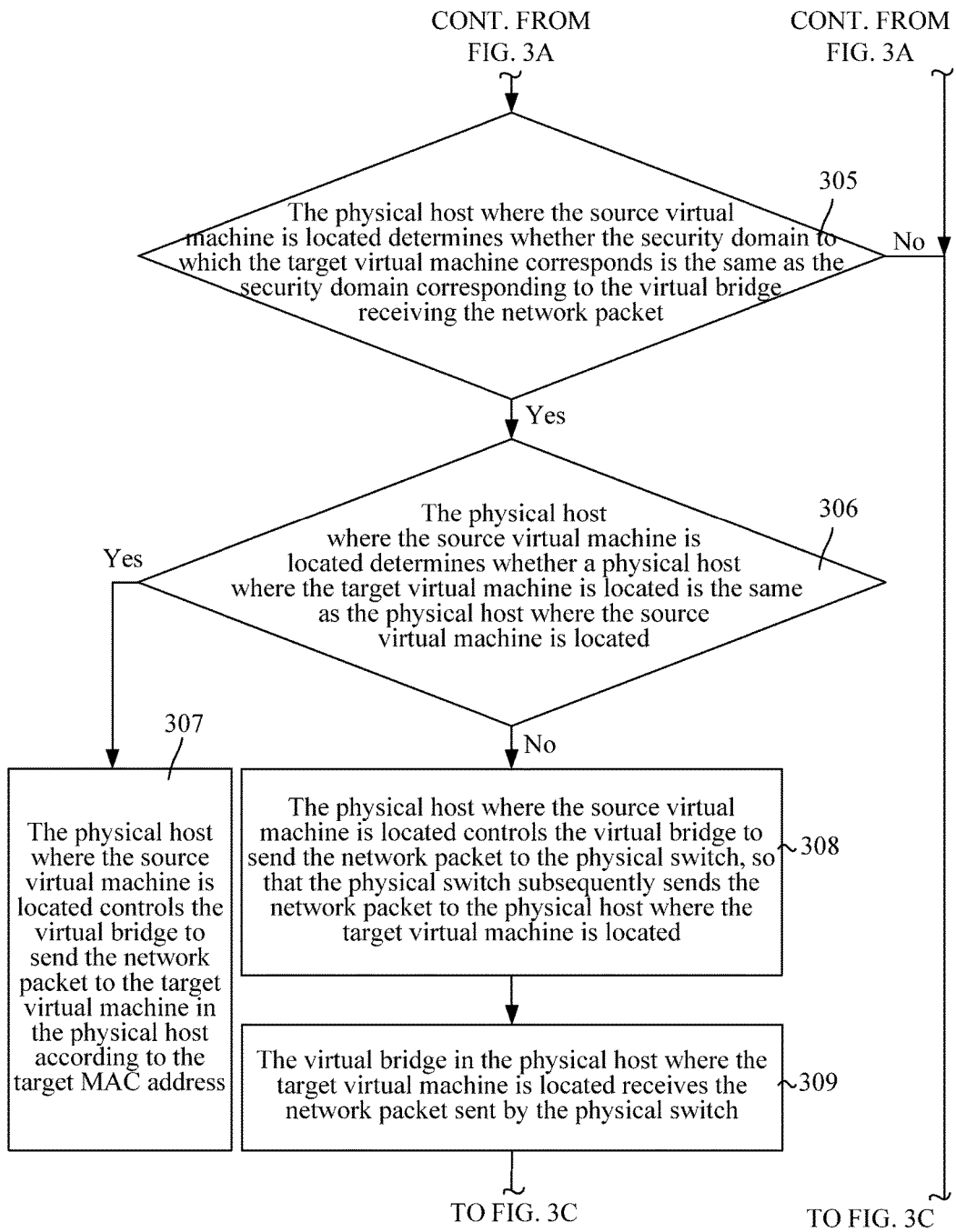
Figure 3C:
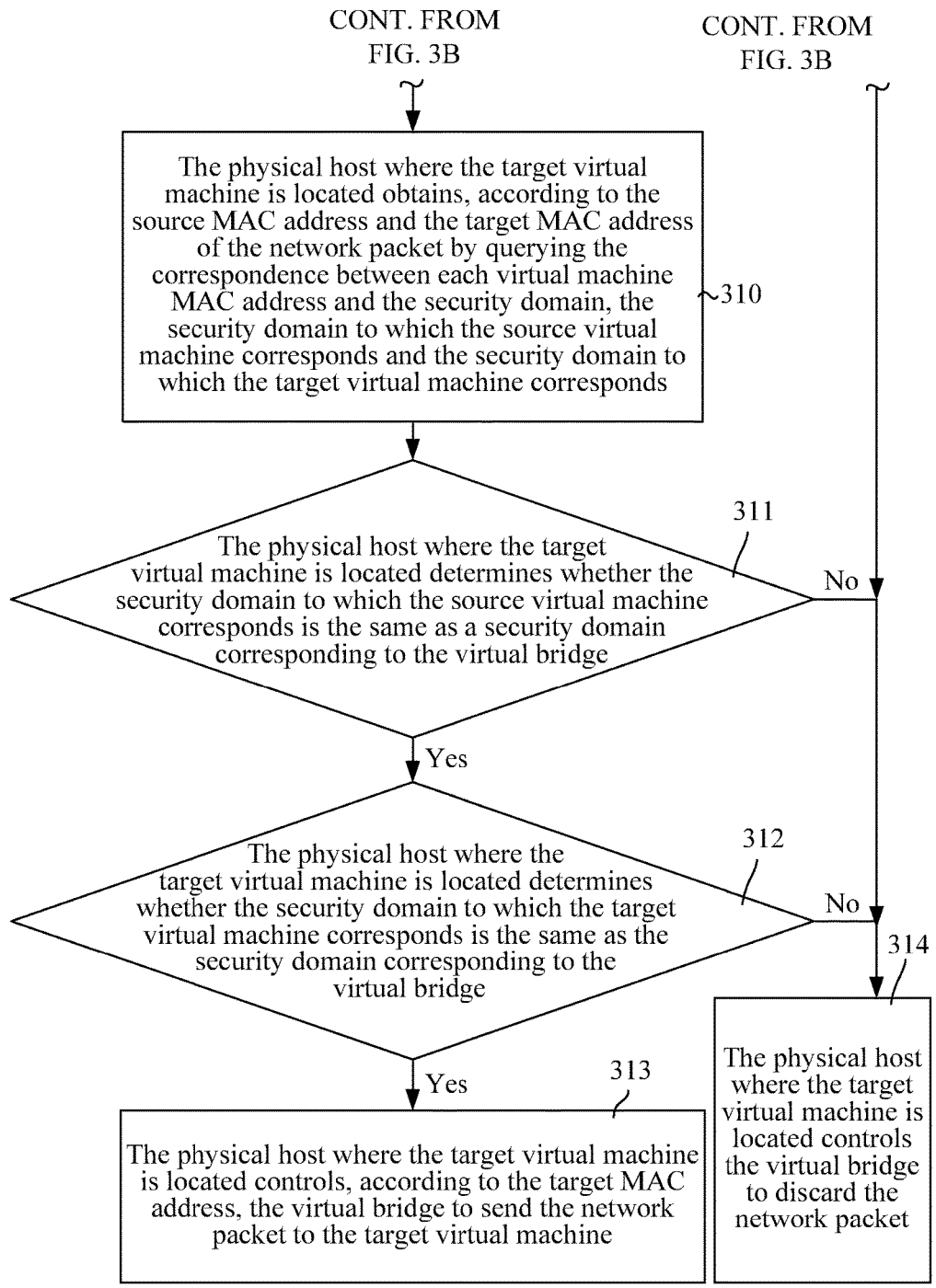

FIG. 3A, FIG. 3B and FIG. 3C are a flow chart of a third embodiment of a method for processing a packet according to the present invention. As shown in FIG. 3A, FIG. 3B and FIG. 3C, this embodiment provides a method for processing a packet, and is specific to a case that a target MAC address of a network packet is a non-broadcast address. This embodiment may include the following steps.

Step 301: A physical host obtains, through a policy controller, correspondence between each virtual machine MAC address and a security domain from a policy server.

In this embodiment, the physical host first obtains, through the policy controller, the correspondence between each virtual machine MAC address and the security domain from the policy server, so as to perform filtering control on a network packet, and divides a virtual local area network into multiple security domains according to correspondence between a virtual machine MAC address and a security domain. The correspondence between each virtual machine MAC address and the security domain that is stored in the policy server is configured by a user in each physical host, and is reported through the policy controller in each physical host to the policy server, so that a MAC group policy of each physical host may be shared between different physical hosts. In this embodiment, a communication isolator may be set in a HOST OS or a virtual machine manager for running a virtual machine, and one policy controller and at least one virtual bridge are set in the communication isolator. Because the virtual machine MAC address can identify the virtual machine and one virtual machine corresponds to one virtual network card, the communication isolator may map, according to the correspondence between each virtual machine MAC address and the security domain, a virtual network card of each virtual machine onto a virtual bridge corresponding to a security domain to which each virtual machine corresponds.

Figure 4:
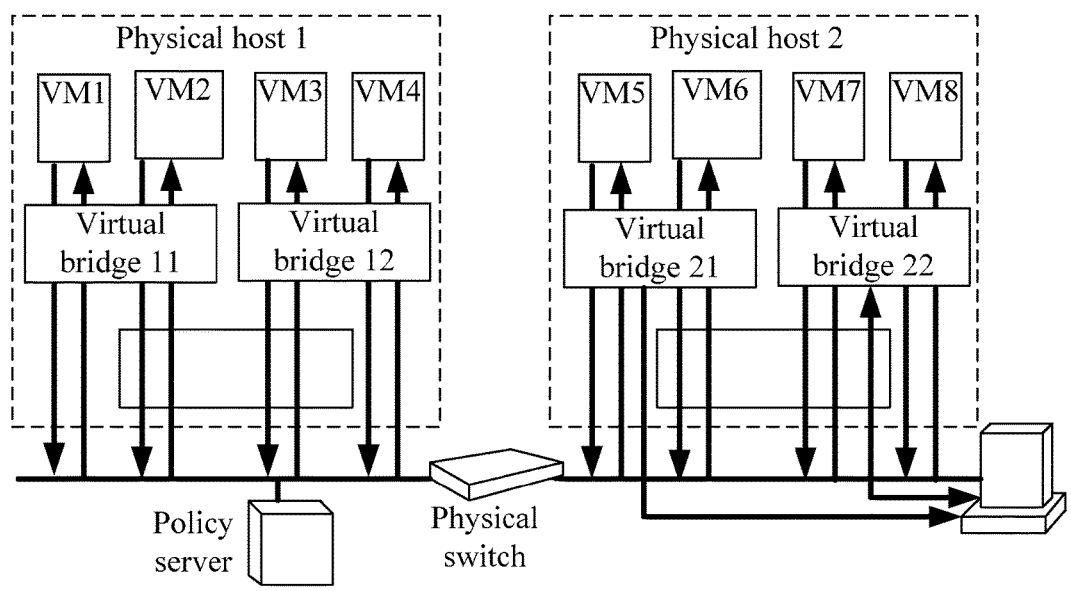
FIG. 4 is a schematic diagram showing an application scenario of a virtual local area network in the third embodiment of the method for processing a packet according to the present invention.

FIG. 4 is a schematic diagram showing an application scenario of a virtual local area network in a third embodiment of a method for processing a packet according to the present invention. For brevity, in FIG. 4, a case that merely two physical hosts and two security domains exist in a virtual network is taken for description, which is similar to a processing solution in a case where more physical hosts and more security domains are contained. As shown in FIG. 4, it is assumed that VM1, VM2, VM5, and VM6 belong to a security domain 1; VM3, VM4, VM7, and VM8 belong to a security domain 2; the security domain 1 corresponds to a virtual bridge 11 in a physical host 1 and a virtual bridge 21 in a physical host 2; the security domain 2 corresponds to a virtual bridge 12 in the physical host 2 and a virtual bridge 22 in the physical host 2; MAC addresses of VM1, VM2, VM5, and VM6 are MAC1, MAC2, MAC5, and MAC6, respectively; MAC addresses of VM3, VM4, VM7, and VM8 are MAC3, MAC4, MAC7, and MAC8, respectively; virtual network cards of VM1 and VM2 are both mapped onto the virtual bridge 11; virtual network cards of VM5 and VM6 are both mapped onto the virtual bridge 21; virtual network cards of MAC3 and MAC4 are both mapped onto the virtual bridge 12; and virtual network cards of MAC7 and MAC8 are both mapped onto the virtual bridge 22.

Step 302: A virtual bridge in a physical host where a source virtual machine is located receives a network packet sent by the source virtual machine to a target virtual machine.

In this step, the physical host where the source virtual machine is located receives the network packet sent by the source virtual machine to the target virtual machine, and the physical host receives the network packet through a virtual bridge corresponding to a security domain to which the source virtual machine corresponds, where the network packet carries a source MAC address and a target MAC address of the network packet. Taking FIG. 4 as an example, network packets sent by VM1 and VM2 are captured by the corresponding virtual bridge 11, and the network packets sent by VM3 and VM4 are captured by the corresponding virtual bridge 12. When VM1 sends a network packet to VM2, the physical host 1 receives the network packet through the virtual bridge 11, where the network packet may carry a source MAC address MAC1 and a target MAC address MAC2. After receiving the network packet, the physical host may recognize, through the target MAC address of the network packet, whether the network packet is a broadcast packet, where when the target MAC address is "all FF", the network packet is a broadcast packet. In this embodiment, the case that the network packet is a non-broadcast packet is taken as an example for description, and a process of processing the broadcast packet will be described in a subsequent fourth embodiment.

Step 303: The physical host where the source virtual machine is located obtains, according to the source MAC address and the target MAC address by querying the correspondence between each virtual machine MAC address and the security domain, the security domain to which the source virtual machine corresponds and a security domain to which the target virtual machine corresponds.

After the physical host where the source virtual machine is located receives the network packet, a communication isolator in the physical host where the source virtual machine is located obtains, according to the source MAC address and the target MAC address by querying the correspondence between each virtual machine MAC address and the security domain, the security domain to which the source virtual machine corresponds and the security domain to which the target virtual machine corresponds. Taking FIG. 4 as an example, after receiving, through the virtual bridge 11, a network packet sent by VM1 to VM2, the physical host 1 may obtain, according to the correspondence between each virtual machine MAC address and the security domain, that security domains corresponding to MAC1 and MAC2 are both the security domain 1, that is, obtain that the security domain to which the source virtual machine corresponds and the security domain to which the target virtual machine corresponds are both the security domain 1.

Step 304: The physical host where the source virtual machine is located determines whether the security domain to which the source virtual machine corresponds is the same as a security domain corresponding to the virtual bridge receiving the network packet; if yes, step 305 is performed; otherwise, step 314 is performed.

The communication isolator in the physical host where the source virtual machine is located first determines whether the security domain to which the source virtual machine corresponds is the same as the security domain corresponding to the virtual bridge receiving the network packet; if yes, step 305 is performed; otherwise, step 314 is performed. Taking FIG. 4 as an example, after receiving, through the virtual bridge 11, the network packet sent by VM1 to VM2, the physical host 1 obtains that the security domain to which the source virtual machine corresponds is the security domain 1, which is the same as the security domain corresponding to the virtual bridge 11, so the physical host 1 performs step 305 to continue determination.

Step 305: The physical host where the source virtual machine is located determines whether the security domain to which the target virtual machine corresponds is the same as the security domain corresponding to the virtual bridge receiving the network packet; if yes, step 306 is performed; otherwise, step 314 is performed.

When the security domain to which the source virtual machine corresponds is the same as the security domain corresponding to the virtual bridge receiving the network packet, the communication isolator in the physical host where the source virtual machine is located continues to determine whether the security domain to which the target virtual machine corresponds is the same as the security domain corresponding to the virtual bridge receiving the network packet; if yes, step 306 is performed; otherwise, step 314 is performed. Taking FIG. 4 as an example, after receiving, through the virtual bridge 11, the network packet sent by VM1 to VM2, the physical host 1 obtains that the security domains of VM1 and VM2 are both the same as the security domain corresponding to the virtual bridge 11, so the physical host 1 performs step 306 to perform forwarding processing on the packet. After receiving, through the virtual bridge 11, a network packet sent by VM1 to VM3, the physical host 1 obtains that the security domain to which VM3 corresponds is different from the security domain corresponding to the virtual bridge 11, so the physical host 1 performs step 314 to directly perform discarding processing on the network packet.

Step 306: The physical host where the source virtual machine is located determines whether a physical host where the target virtual machine is located is the same as the physical host where the source virtual machine is located; if yes, step 307 is performed; otherwise, step 308 is performed.

When the security domain to which the source virtual machine corresponds and the security domain to which the target virtual machine corresponds are both the same as the security domain corresponding to the virtual bridge receiving the network packet, the communication isolator in the physical host where the source virtual machine is located continues to determine whether the physical host where the target virtual machine is located is the same as the physical host where the source virtual machine is located; if yes, step 307 is performed; otherwise, step 308 is performed. The physical host may establish and store, according to a security domain selected when a virtual machine is installed, a mapping between a virtual machine MAC address and a virtual bridge. In this case, it may be determined, according to the mapping, whether the source virtual machine and the target virtual machine are mapped onto the same virtual bridge, and if the source virtual machine and the target virtual machine are mapped onto the same virtual bridge, it is apparent that the source virtual machine and the target virtual machine are located in the same physical host.

Taking FIG. 4 as an example, after receiving, through the virtual bridge 11, the network packet sent by VM1 to VM2, the physical host 1 obtains that the security domain to which VM1 corresponds is the same as the security domain corresponding to the virtual bridge 11 and the security domain to which VM2 corresponds is also the same as the security domain corresponding to the virtual bridge 11, and VM1 and VM2 are both located in the physical host 1, so step 307 is performed to directly control the virtual bridge 11 to directly send the network packet to VM2. After receiving, through the virtual bridge 11, a network packet sent by VM1 to VM5, the physical host 1 obtains that the security domain to which VM1 corresponds is the same as the security domain corresponding to the virtual bridge 11 and the security domain to which VM5 corresponds is also the same as the security domain corresponding to the virtual bridge 11, but VM1 and VM5 are respectively located in the physical host 1 and the physical host 2, so step 308 is performed to forward the network packet through a physical switch.

Step 307: The physical host where the source virtual machine is located controls the virtual bridge to send the network packet to the target virtual machine in the physical host according to the target MAC address.

When the security domain to which the source virtual machine corresponds is the same as the security domain corresponding to the virtual bridge receiving the network packet, the security domain to which the target virtual machine corresponds is the same as the security domain corresponding to the virtual bridge receiving the network packet, and the communication isolator in the physical host where the source virtual machine is located continues to determine that the physical host where the target virtual machine is located is also the same as the physical host where the source virtual machine is located, the virtual bridge corresponding to the security domain to which the source virtual machine corresponds may directly send, according to the target MAC address, the network packet to the target virtual machine in the physical host where the source virtual machine is located. For example, VM1 and VM2 in FIG. 4 both belong to the security domain 1 and are located in the same physical host, so that the virtual bridge 11 may directly send the network packet from VM1 to VM2 without processing of the physical switch, thereby easing the burden of the physical switch.

Step 308: The physical host where the source virtual machine is located controls the virtual bridge to send the network packet to the physical switch, so that the physical switch subsequently sends the network packet to the physical host where the target virtual machine is located.

When the security domain to which the source virtual machine corresponds is the same as the security domain corresponding to the virtual bridge receiving the network packet, and the security domain to which the target virtual machine corresponds is the same as the security domain corresponding to the virtual bridge receiving the network packet, but the physical host where the target virtual machine is located is different from the physical host where the source virtual machine is located, because the two virtual machines are not located in the same physical host, the physical switch is required for forwarding, and the communication isolator may control the virtual bridge, corresponding to the security domain to which the source virtual machine corresponds and located in the physical host where the source virtual machine is located, to send the network packet to the physical switch, and then the physical switch forwards the network packet to a virtual bridge corresponding to the target virtual machine in the physical host where the target virtual machine is located. For example, VM1 and VM5 in FIG. 4 both belong to the security domain 1, but they are not located in the same physical host; and in this case, the virtual bridge 11 may forward, through the physical switch, the network packet from VM1 to the corresponding virtual bridge 21 in a physical host where VM5 is located, so that a network filtering function can be implemented without depending on the filtering control processing of the physical switch, and the physical switch merely needs to forward the network packet, which can also ease the burden of the physical switch.

Step 309: The virtual bridge in the physical host where the target virtual machine is located receives the network packet sent by the physical switch.

The physical switch indiscriminately performs the same forwarding processing on a network packet from a virtual machine and a packet from a physical host. The physical switch stores a mapping between each MAC address (including a MAC address of a virtual machine and also including a MAC address of a physical host) and a switch port, and after receiving a network packet, the physical switch queries a switch port corresponding to a target MAC address of the network packet, and then forwards the network packet through the switch port obtained by means of querying. For example, MAC5, MAC6, MAC7, MAC8, and a MAC address of the physical host 2 are all mapped onto the same switch port, the physical switch sends all network packets with a target MAC address being MAC5, MAC6, MAC7, MAC8, or the MAC address of the physical host 2 to a network interface of the physical host 2; the virtual bridge needs to further determine, according to a mapping between the virtual machine MAC and the virtual bridge, whether the network packets should be sent to VM5, VM6, VM7, VM8, or an operation system of the physical host 2. In this embodiment, merely a process of processing a network packet sent by one virtual machine to another virtual machine is described. For example, the physical host 2 controls, according to the mapping between the virtual machine MAC address and the virtual bridge in the physical host, the virtual bridge 21, on which the target virtual machine VM5 is mapped, to forward the network packet.

Step 310: The physical host where the target virtual machine is located obtains, according to the source MAC address and the target MAC address of the network packet by querying the correspondence between each virtual machine MAC address and the security domain, the security domain to which the source virtual machine corresponds and the security domain to which the target virtual machine corresponds.

Optionally, similar to the first embodiment, the physical host 2 obtains, through a policy controller, a MAC group policy of a virtual local area network from the policy server in a network where the physical host 2 is located, where the MAC group policy of the virtual local area network includes the correspondence between each MAC address and the security domain.

Step 311: The physical host where the target virtual machine is located determines whether the security domain to which the source virtual machine corresponds is the same as a security domain corresponding to the virtual bridge; if yes, step 312 is performed; otherwise, step 314 is performed.

In this step, in the physical host where the target virtual machine is located, after the virtual bridge corresponding to the security domain to which the target virtual machine corresponds receives the network packet forwarded by the physical switch, a communication isolator in the physical host where the target virtual machine is located determines whether the security domain to which the source virtual machine corresponds is the same as the security domain corresponding to the virtual bridge receiving the network packet; if yes, step 312 is performed; otherwise, step 314 is performed. Because the source virtual machine and the target virtual machine belong to the same security domain, the security domain to which the target virtual machine corresponds is the same as the security domain to which the source virtual machine corresponds. For example, VM1 and VM5 in FIG. 4 both belong to the security domain 1, but they are not located in the same physical host, and the virtual bridge corresponding to VM5 is the virtual bridge 21 in the physical host 2; in this case, after receiving, through the virtual bridge 21, the network packet forwarded by the physical switch, the physical host 2 first determines whether the security domain to which VM1 corresponds is the same as the security domain corresponding to the virtual bridge 21, and learns, through determination, that the security domain to which VM1 corresponds and the security domain corresponding to the virtual bridge 21 both are the security domain 1, so that a subsequent determination step may be continued.

Step 312: The physical host where the target virtual machine is located determines whether the security domain to which the target virtual machine corresponds is the same as the security domain corresponding to the virtual bridge; if yes, step 313 is performed; otherwise, step 314 is performed.

When the communication isolator in the physical host where the target virtual machine is located learns that the security domain to which the source virtual machine corresponds is the same as the security domain corresponding to the virtual bridge receiving the network packet, and the virtual bridge herein refers to the virtual bridge corresponding to the security domain to which the target virtual machine corresponds, the communication isolator continues to determine whether the security domain to which the target virtual machine corresponds is the same as the security domain corresponding to the virtual bridge receiving the network packet; if yes, step 313 is performed; otherwise, step 314 is performed. Still taking VM1 to VM5 in FIG. 4 as an example, when the virtual bridge 21 in the physical host 2 learns that the security domain to which VM1 corresponds is the same as the security domain corresponding to the virtual bridge 21, the physical host 2 continues to determine whether the security domain to which VM5 corresponds is the same as the security domain corresponding to the virtual bridge 21, and learns, through determination, that the security domain to which VM5 corresponds and the security domain corresponding to the virtual bridge 21 both are the security domain 1, so that step 313 is performed to directly forward the network packet to VM5.

Step 313: The physical host where the target virtual machine is located controls, according to the target MAC address, the virtual bridge to forward the network packet to the target virtual machine.

When the physical host where the target virtual machine is located learns that the security domain to which the source virtual machine corresponds is the same as the security domain corresponding to the virtual bridge receiving the network packet, and the security domain to which the target virtual machine corresponds is the same as the security domain corresponding to the virtual bridge receiving the network packet, the physical host where the target virtual machine is located sends, according to the target MAC address, the network packet to the target virtual machine in the physical host, so that filtering control is performed on the network packet on both the virtual bridges corresponding to the source virtual machine and the target virtual machine, thereby further improving the security of the virtual local area network.

Step 314: The physical host where the target virtual machine is located controls the virtual bridge to discard the network packet.

When the virtual bridge corresponding to the target virtual machine learns that the security domain to which the source virtual machine corresponds is the same as the security domain corresponding to the virtual bridge receiving the network packet, but the security domain to which the target virtual machine corresponds is different from the security domain corresponding to the virtual bridge receiving the network packet, the communication isolator in the physical host where the target virtual machine is located controls the virtual bridge corresponding to the security domain to which the target virtual machine corresponds to perform discarding processing on the network packet, so as to block the communication between the source virtual machine and the target virtual machine, so that filtering control is performed on the network packet on both the virtual bridges corresponding to the source virtual machine and the target virtual machine, thereby further improving the security of the virtual local area network.

It should be noted that, in this embodiment, there is no strict restriction on the sequence of performing part of the foregoing steps, for example, the sequence of steps 304 and 305 is interchangeable, and the sequence of steps 311 and 312 is interchangeable.

In addition, this embodiment may further prevent MAC fraud and attack, that is, prevents the user from deceiving and attacking by maliciously tampering with the MAC address of the virtual machine. Still taking FIG. 4 as an example, if a user of VM2 expects to communicate with a computer in the security domain 2, the user tampers with the MAC address of VM2 to change it to the MAC address of VM3, that is, changes MAC2 to MAC3, and tries to use the tampered MAC address to communicate with VM4; in this case, the source MAC address of the network packet is MAC3, and the target address thereof is MAC4. When VM2 sends a network packet to VM4 using MAC3, after the virtual bridge 1 in the security domain 1 on which VM2 is mapped receives the network packet, the virtual bridge 1 finds that the source MAC address MAC3 does not belong to the security domain 1, so the virtual bridge 1 blocks the sending of the network packet, and VM2 cannot pretend to be VM3 to perform external communication.

This embodiment provides a method for processing a packet, where a physical host receives, through a virtual bridge, a network packet sent by a source virtual machine to a target virtual machine and forwarded by a physical switch, obtains, according to a MAC group policy, a source MAC address and a target MAC address, a security domain to which the source virtual machine corresponds and a security domain to which the target virtual machine corresponds respectively, and performs sending control processing on the network packet according to the security domain to which a source virtual machine corresponds and the security domain to which a target virtual machine corresponds. In this embodiment, filtering control on the network packet is implemented through the virtual bridge, and it is not required to send all traffic between virtual machines to the physical switch for processing, thereby greatly easing the burden of the physical switch and improving communication efficiency of a virtual network.

Figure 5A:
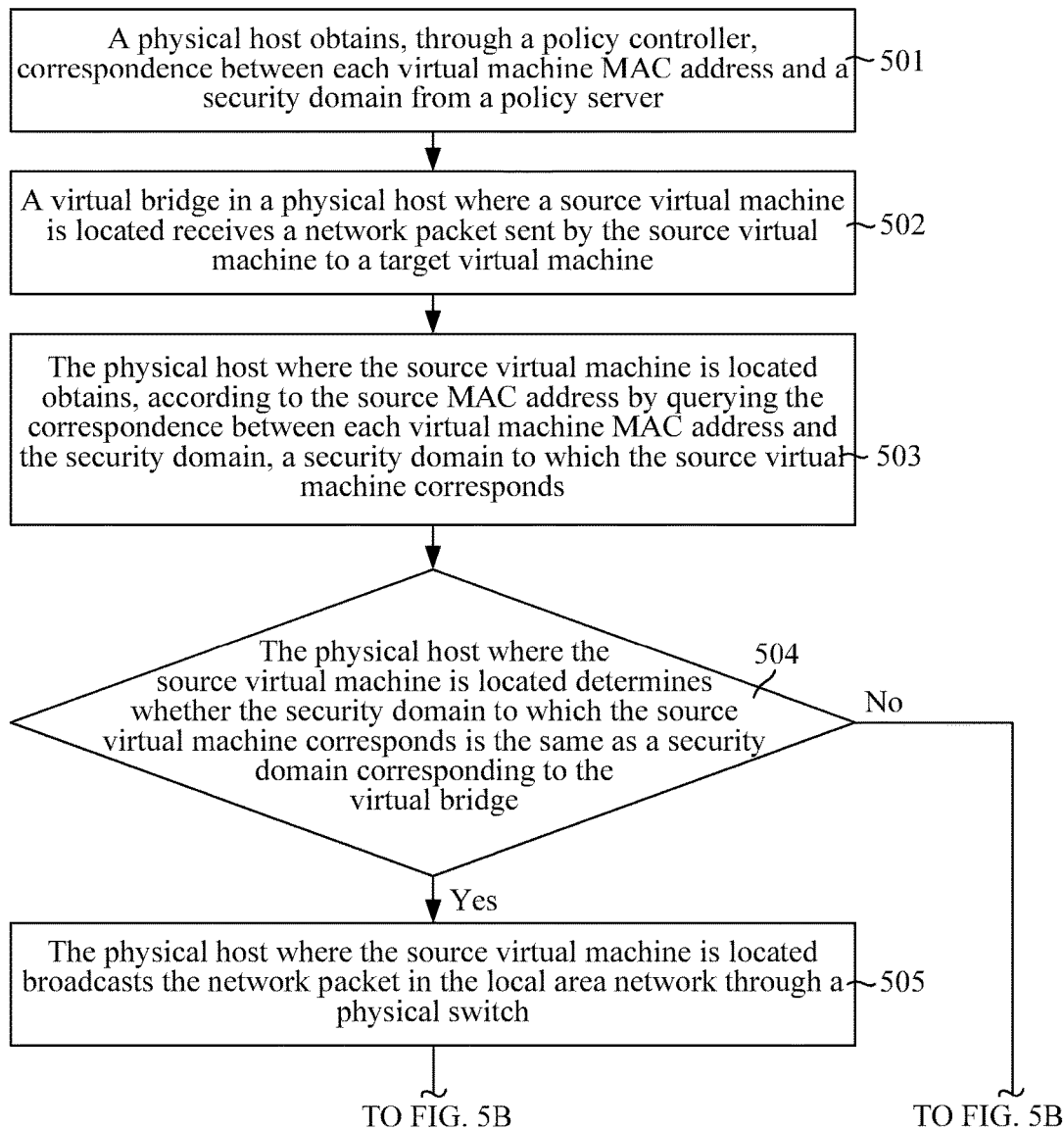
FIG. 5A and FIG. 5B together form a flow chart of a fourth embodiment of a method for processing a packet according to the present invention.
Figure 5B:
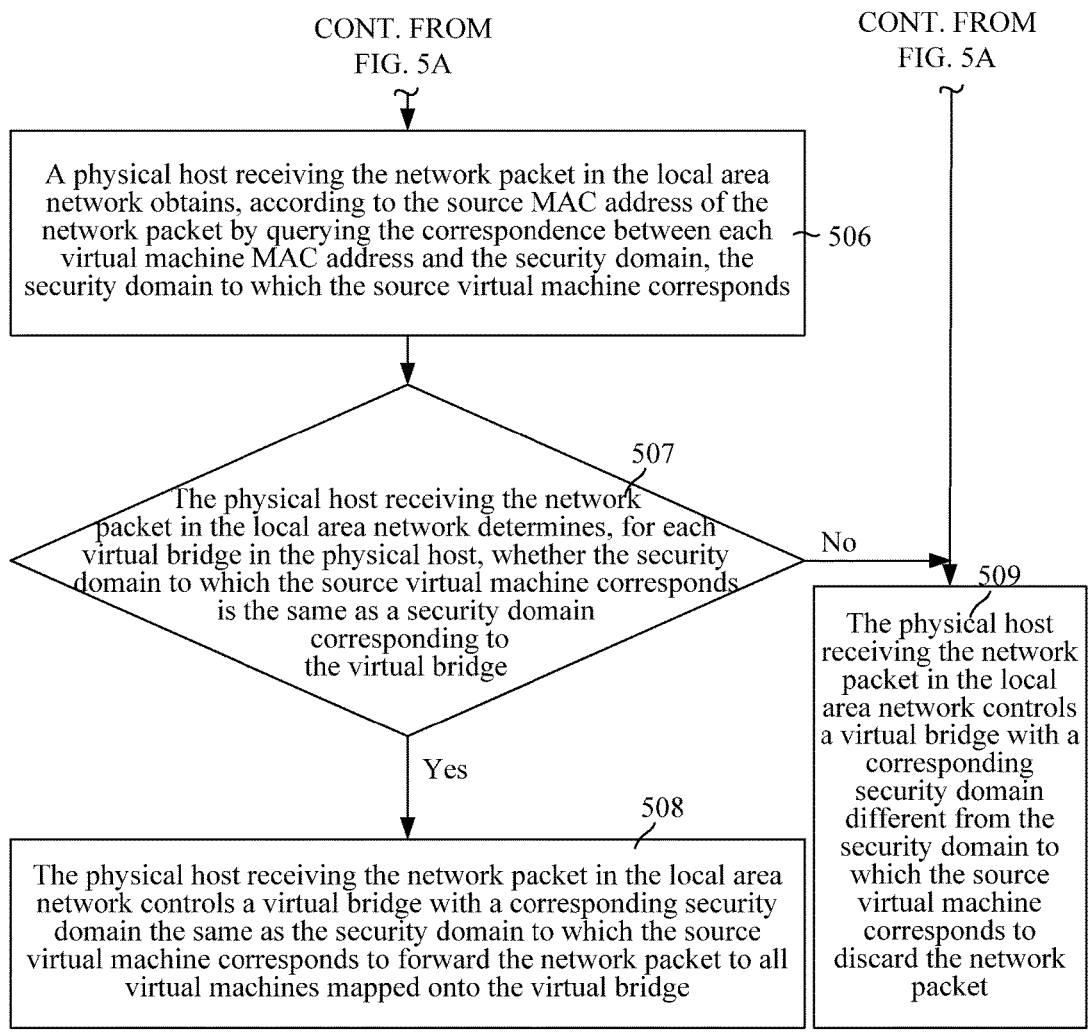

FIG. 5A and FIG. 5B are a flow chart of a fourth embodiment of a method for processing a packet according to the present invention. As shown in FIG. 5A and FIG. 5B, this embodiment provides a method for processing a packet, and is specific to a case that a target MAC address of a network packet is a broadcast address. This embodiment may include the following steps.

Step 501: A physical host obtains, through a policy controller, correspondence between each virtual machine MAC address and a security domain from a policy server, where this step is similar to step 301, so the details are not described herein again.

Step 502: A virtual bridge in a physical host where a source virtual machine is located receives a network packet sent by the source virtual machine to a target virtual machine.

In this step, the physical host where the source virtual machine is located receives, through the virtual bridge, the network packet sent by the source virtual machine to the target virtual machine, where the virtual bridge may be a virtual bridge corresponding to a security domain to which the source virtual machine corresponds, and the network packet carries a source MAC address and a target MAC address of the network packet. This embodiment is specific to a process of processing an Ethernet broadcast packet, so the target MAC address carried in the network packet is an Ethernet broadcast address, that is, the target of the network packet is all computers in a local area network. After receiving the network packet, the physical host may recognize, through the target MAC address of the network packet, whether the network packet is a broadcast packet, where when the target MAC address is "all FF", the network packet is a broadcast packet. In this embodiment, the case that the network packet is a broadcast packet is taken as an example for description.

Step 503: The physical host where the source virtual machine is located obtains, according to the source MAC address by querying the correspondence between each virtual machine MAC address and the security domain, a security domain to which the source virtual machine corresponds.

Because the target virtual machine is not a specific virtual machine, the virtual bridge corresponding to the source virtual machine merely obtains the security domain to which the source virtual machine corresponds. A specific obtaining method is similar to step 303, so the details are not described herein again.

Step 504: The physical host where the source virtual machine is located determines whether the security domain to which the source virtual machine corresponds is the same as a security domain corresponding to the virtual bridge; if yes, step 505 is performed; otherwise, step 509 is performed.

In this step, a communication isolator in the physical host where the source virtual machine is located determines whether the security domain to which the source virtual machine corresponds is the same as the security domain corresponding to the virtual bridge receiving the network packet; if yes, step 505 is performed to directly broadcast the network packet in the local area network; otherwise, step 509 is performed to perform discarding processing on the network packet.

Step 505: The physical host where the source virtual machine is located broadcasts the network packet in the local area network through a physical switch.

When the security domain to which the source virtual machine corresponds is the same as the security domain corresponding to the virtual bridge receiving the network packet, the physical host where the source virtual machine is located broadcasts, through the physical switch, the network packet in the local area network. Taking FIG. 4 as an example, if VM 1 expects to communicate with VM5, but does not know the MAC address of VM5, VM1 may first send an address resolution protocol (ARP) request network packet to all computers in a local area network in a manner of sending a broadcast packet; because VM1 belongs to a security domain 1, the network packet may be obtained by a virtual bridge 11; and when learning, through determination, that a security domain to which VM1 corresponds is the same as a security domain corresponding to the virtual bridge 11, a communication isolator in a physical host 1 controls the virtual bridge 11 to broadcast the network packet in the local area network through a physical switch.

For a process of forwarding the network packet by the physical switch, reference is made to the description in step 309 in FIG. 3B, so the details are not described herein again.

Step 506: A physical host receiving the network packet in the local area network obtains, according to the source MAC address of the network packet by querying the correspondence between each virtual machine MAC address and the security domain, the security domain to which the source virtual machine corresponds.

Step 507: The physical host receiving the network packet in the local area network determines, for each virtual bridge in the physical host, whether the security domain to which the source virtual machine corresponds is the same as a security domain corresponding to the virtual bridge; if yes, step 508 is performed; otherwise, 509 is performed.

After the physical switch where the source virtual machine is located broadcasts the network packet in the local area network, all virtual bridges in the local area network receive the network packet, that is, all physical hosts in the local area network receive the network packet respectively through their virtual bridges. In this step, a communication isolator in the physical host receiving the network packet in the local area network determines whether the security domain to which the source virtual machine corresponds is the same as the security domain corresponding to the virtual bridge; if yes, step 508 is performed; otherwise, step 509 is performed. Still taking FIG. 4 as an example, when VM1 expects to communicate with VM5, VM1 sends a network packet to the local area network in a broadcast packet manner, and the virtual bridge 11 broadcasts the network packet in the local area network through the physical switch. All virtual bridges in the local area network receive the broadcast packet through the physical switch, and obtain a security domain to which the source virtual machine corresponds according to a source MAC address of the broadcast packet. A communication isolator in each physical host determines whether the security domain to which the source virtual machine corresponds is the same as a security domain corresponding to a virtual bridge receiving the packet in the local area network; if yes, step 508 is performed; otherwise, step 509 is performed. That is, when the network packet is broadcast in the local area network, the virtual bridge 11, a virtual bridge 12, a virtual bridge 21, and the virtual bridge 22 all receive the network packet; the physical host 1 receives the network packet through the virtual bridge 11 and the virtual bridge 12; a physical host 2 receives the network packet through the virtual bridge 21 and the virtual bridge 22; the physical host 1 determines whether security domains corresponding to the virtual bridge 11 and the virtual bridge 12 are the same as the security domain to which the source virtual machine corresponds; and the physical host 2 determines whether security domains corresponding to the virtual bridge 21 and the virtual bridge 22 are the same as the security domain to which the source virtual machine corresponds. Through the determination, the security domains corresponding to the virtual bridge 11 and the virtual bridge 21 are the same as the security domain to which the source virtual machine corresponds, and then the virtual bridge 11 forwards the network packet to all virtual machines mapped onto the virtual bridge 11, that is, VM5 and VM6 in FIG. 4; while security domains corresponding to the virtual bridge 12 and the virtual bridge 22 are different from the security domain to which the source virtual machine corresponds, and then the virtual bridges 12 and 22 perform discarding processing on the network packet.

Step 508: The physical host receiving the network packet in the local area network controls a virtual bridge with a corresponding security domain the same as the security domain to which the source virtual machine corresponds to forward the network packet to all virtual machines mapped onto the virtual bridge.

After receiving the network packet, the virtual bridge belonging to the same security domain as the source virtual machine of the network packet forwards the network packet to all the virtual machines mapped onto the virtual bridge. As shown in FIG. 4, if VM5 is switched on in this case, VM5 will receive an ARP Request packet forwarded by the virtual bridge 22.

Step 509: The physical host receiving the network packet in the local area network controls a virtual bridge with a corresponding security domain different from the security domain to which the source virtual machine corresponds to discard the network packet.

When the security domain corresponding to the virtual bridge receiving the network packet in the local area network is different from the security domain to which the source virtual machine corresponds, the virtual bridge discards the packet.

This embodiment provides a method for processing a packet, where a virtual bridge corresponding to a target virtual machine receives a network packet sent by a source virtual machine and forwarded by a physical switch, obtains a security domain to which the source virtual machine corresponds according to correspondence between each virtual machine MAC address and a security domain and a source MAC address, and performs sending control processing on the network packet according to the security domain to which the source virtual machine corresponds and a security domain corresponding to the virtual bridge. In this embodiment, isolation between broadcast packets in different security domains is implemented through the virtual bridge, and in this process, no additional filtering control processing needs to be performed by the physical switch, thereby greatly easing the burden of the physical switch and improving communication efficiency of the virtual network.

Figure 6:
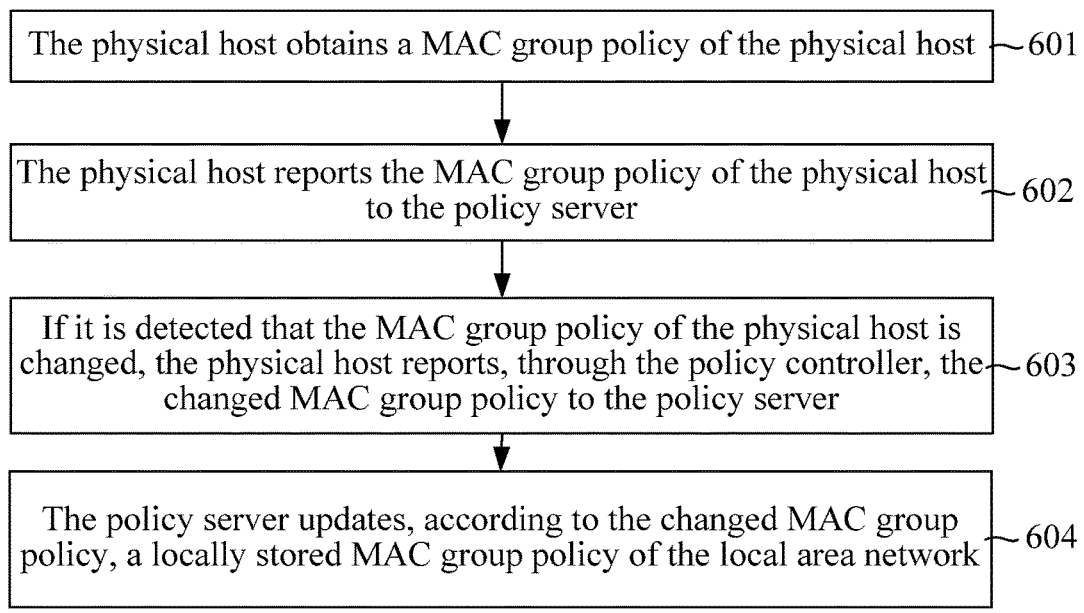
FIG. 6 is a flow chart of a fifth embodiment of a method for processing a packet according to the present invention.

FIG. 6 is a flow chart of a fifth embodiment of a method for processing a packet according to the present invention. As shown in FIG. 6, this embodiment provides a method for processing a packet, and is applied in a virtual machine migration scenario, where virtual machine migration refers to that a virtual machine originally implemented on a basis of a hardware resource and a processing resource of one physical host is changed to be implemented on a basis of a hardware resource and a processing resource of another physical host. In this embodiment, the implementation principle of the virtual machine migration is not discussed, and only a method for isolating network packets in different security domains before and after the virtual machine migration is introduced.

This embodiment may further include the following steps on the basis of the third embodiment or the fourth embodiment.

Step 601: The physical host obtains a MAC group policy of the physical host.

In this embodiment, before packet processing, each physical host in the local area network may first obtain a MAC group policy of each physical host, where the MAC group policy may include the correspondence between each virtual machine MAC address and the security domain. The MAC group policy may be set by a user according to an actual situation, where correspondence between a virtual bridge and a security domain may also be set by the user according to an actual situation. From the perspective of the user, when a virtual machine is installed in the physical host, network communication isolation software in the physical host pops up an option list, where each option corresponds to one security domain. Because one virtual machine corresponds to one virtual machine MAC address, after the virtual machine is installed in the physical host, the physical host may automatically obtain a MAC address of the virtual machine. When receiving an option selected by the user according to the option list, after the installation of the virtual machine is completed, the network communication isolation software in the physical host maps a virtual network card of the virtual machine on a virtual bridge corresponding to the selected security domain, so as to establish correspondence between the virtual machine MAC address and the security domain to which the virtual bridge corresponds; therefore, the physical host may obtain the correspondence between the virtual machine MAC address and the security domain. For each virtual machine, the physical host can obtain, through the foregoing process, correspondence between a virtual machine MAC address in the physical host and a security domain. Meanwhile, the physical host may further obtain correspondence between a virtual bridge and a security domain that is set by the user.

Step 602: The physical host reports the MAC group policy of the physical host to the policy server.

After obtaining the MAC group policy of the physical host, the physical host reports, through a policy controller in the physical host, the MAC group policy of the physical host, that is, the correspondence between each virtual machine MAC address in the physical host and the security domain to the policy server. Each physical host in the local area network reports, through its own policy controller, its own MAC group policy to the policy server, and the policy server locally stores MAC packet policies of the entire local area network. Subsequently, one physical host may obtain, through a policy controller in the physical host, a MAC group policy of another physical host from the policy server.

Figure 7:
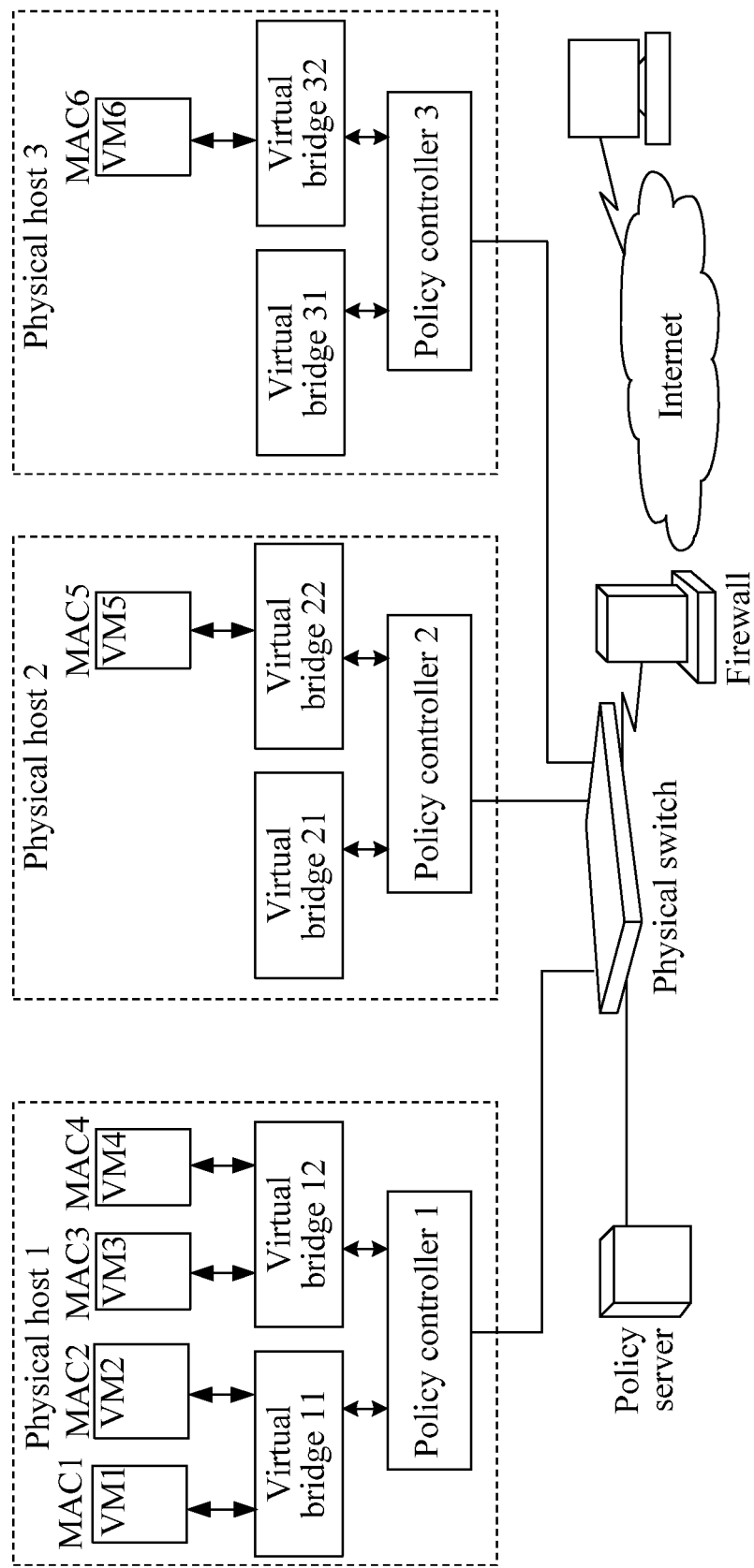
FIG. 7 is a schematic diagram showing an application scenario of a virtual local area network before migration in the fifth embodiment of the method for processing a packet according to the present invention.

FIG. 7 is a schematic diagram showing an application scenario of a virtual local area network before migration in the fifth embodiment of the method for processing a packet according to the present invention. As shown in FIG. 7, MAC addresses of VM1 to VM6 are MAC1 to MAC6 respectively, and a MAC address of a firewall is MAC-F; before the virtual machine migration, VM1, VM2, VM3, and VM4 are installed in a physical host 1, VM5 is installed in a physical host 2, VM6 is installed in a physical host 3, a virtual bridge 11 and a virtual bridge 12 are set in the physical host 1, a virtual bridge 21 and a virtual bridge 22 are set in the physical host 2, and a virtual bridge 31 and a virtual bridge 32 are set in the physical host 3. According to an actual situation, the user maps virtual network cards of VM1 and VM2 on the virtual bridge 11, maps virtual network cards of VM3 and VM4 on the virtual bridge 12, maps a virtual network card of VM5 on the virtual bridge 22, maps a virtual network card of VM6 on the virtual bridge 32; and meanwhile, sets that the virtual bridges 11, 21, and 31 all belong to a security domain 1, and that the virtual bridges 12, 22, and 32 all belong to a security domain 2. The physical host 1 may obtain a MAC group policy of the physical host 1, that is, correspondence exists between VM1, VM2 and the security domain 1, and correspondence exists between VM3, VM4 and the security domain 2; and in addition, may further learn that, correspondence exists between the virtual bridge 11 and the security domain 1 and correspondence exists between the virtual bridge 12 and the security domain 2. The physical host 2 may obtain a MAC group policy of the physical host 2, that is, correspondence exists between VM5 and the security domain 2; and may further learn that, correspondence exists between the virtual bridge 21 and the security domain 1 and correspondence exists between the virtual bridge 22 and the security domain 2. The physical host 3 may obtain a MAC group policy of the physical host 3, that is, correspondence exists between VM6 and the security domain 2; and may further learn that, correspondence exists between the virtual bridge 31 and the security domain 1 and correspondence exists between the virtual bridge 32 and the security domain 2. Then, the physical host 1 reports, through a policy controller 1, the MAC group policy of the physical host 1 to the policy server; the physical host 2 reports, through a policy controller 2, the MAC group policy of the physical host 2 to the policy server; and the physical host 3 reports, through a policy controller 3, the MAC group policy of the physical host 3 to the policy server.

Step 603: If it is detected that the MAC group policy of the physical host is changed, the physical host reports, through the policy controller, the changed MAC group policy to the policy server.

In this embodiment, the physical host further performs periodically detection on the MAC group policy of the physical host, and determines whether the MAC group policy is changed; and when the MAC group policy is changed, the physical host reports, through the policy controller, the changed MAC group policy to the policy server.

Step 604: The policy server updates, according to the changed MAC group policy, a locally stored MAC group policy of the local area network.

The policy server receives a changed MAC group policy sent by a policy controller in each physical host, and updates, according to the changed MAC group policy, a locally stored MAC group policy of the local area network, so that another physical host can synchronously obtain the updated MAC group policy of the local area network from the policy server. It should be noted that, a packet processing process before and after the virtual machine migration may be consistent with the description in the third embodiment or the fourth embodiment, so the details are not described herein again. Optionally, in order to ensure consistency of the MAC group policy in each physical host, the policy server may automatically send, after each update, the updated MAC group policy of the local area network to the policy controller in each physical host; and the policy server may also periodically send, according to a set synchronization cycle, the updated MAC group policy of the local area network to the policy controller in each physical host.

Figure 8:
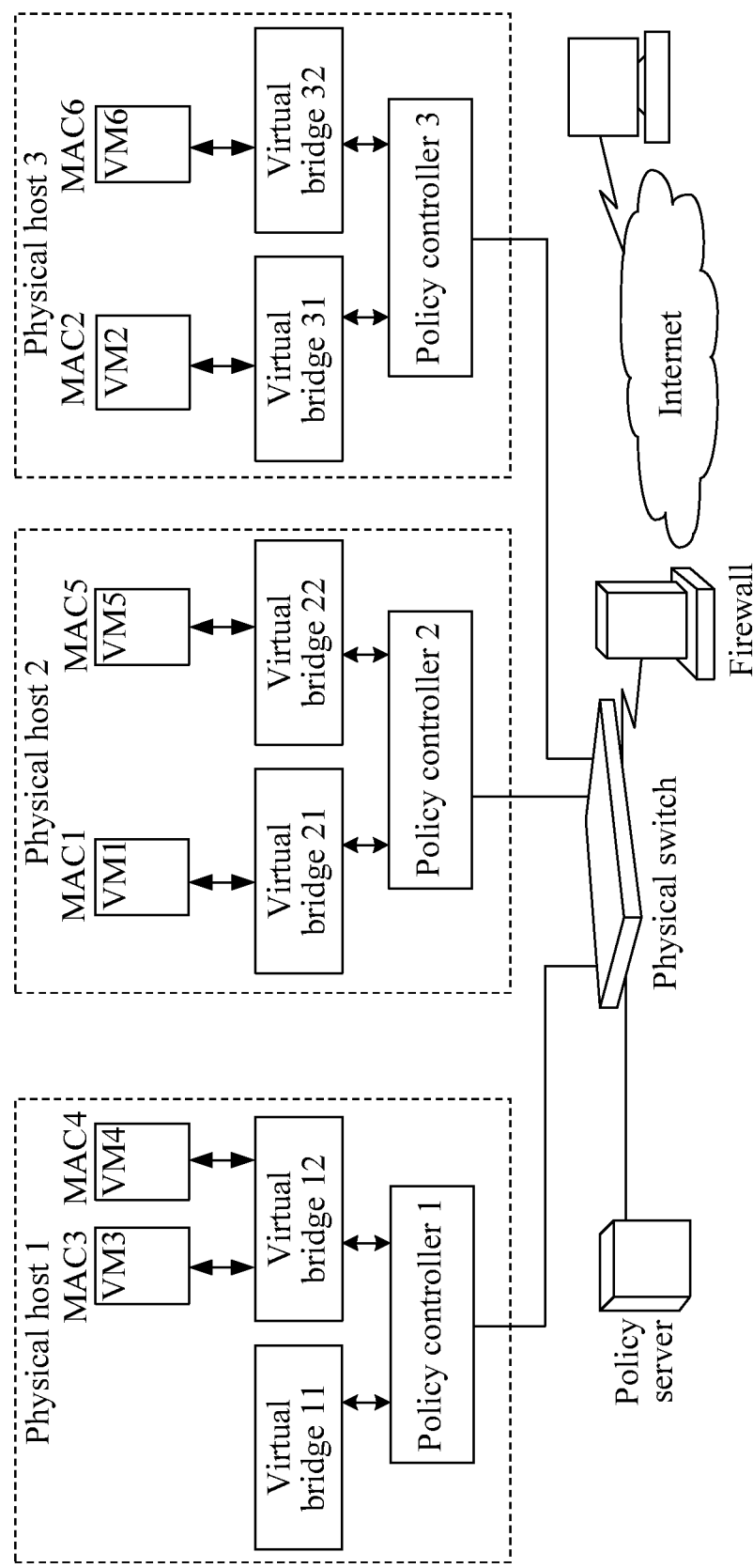
FIG. 8 is a schematic diagram showing an application scenario of the virtual local area network after migration in the fifth embodiment of the method for processing a packet according to the present invention.

When a virtual machine migrates, a corresponding MAC group policy is probably changed. FIG. 8 is a schematic diagram showing an application scenario of a virtual local area network after migration in the fifth embodiment of the method for processing a packet according to the present invention. As shown in FIG. 8, after the virtual machine migrates, VM1 migrates from the physical host 1 to the physical host 2, and VM2 migrates from the physical host 1 to the physical host 3; the virtual network card of VM1 is mapped onto the virtual bridge 21, and the virtual network card of VM2 is mapped onto the virtual bridge 31. After the virtual machine migration, each physical host detects that its own MAC group policy is changed, so each physical host reports its own changed MAC group policy to the policy server. The virtual bridge 21 and the virtual bridge 11 both belong to the security domain 1, while the virtual bridge 31 and the virtual bridge 12 do not belong to the same security domain. After VM1 migrates from the physical host 1 to the physical host 2, the virtual bridge 1 in the physical host 2 obtains a MAC group policy from the policy server, so as to implement traffic control on VM1. It can be seen that, VM1 can still normally communicate with another VM after migration, and communication interruption due to the migration does not occur.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a read-only memory (ROM), a random access memory (RAM), a magnetic disk, or an optical disk.

Figure 9:
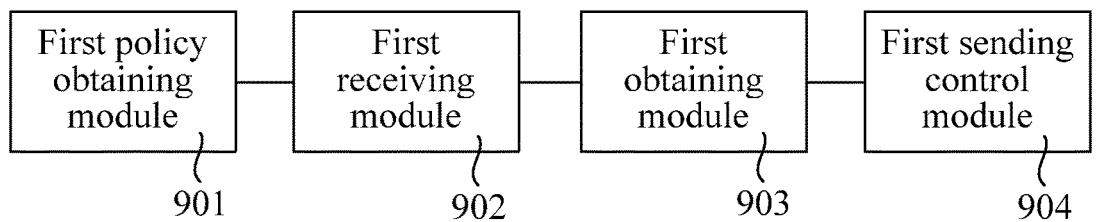
FIG. 9 is a schematic structural diagram of a first embodiment of an apparatus for processing a packet according to the present invention.

FIG. 9 is a schematic structural diagram of a first embodiment of an apparatus for processing a packet according to the present invention. As shown in FIG. 9, this embodiment provides an apparatus for processing a packet, which can perform steps of the method in the first embodiment, so the details are not described herein again. The apparatus for processing a packet provided by this embodiment may include a first policy obtaining module 901, a first receiving module 902, a first obtaining module 903, and a first sending control module 904. The first policy obtaining module 901 is configured to obtain correspondence between each virtual machine MAC address and a security domain. The first receiving module 902 is configured to receive, through a virtual bridge in a physical host, a network packet sent by a source virtual machine in the physical host, where the network packet carries a source MAC address and a target MAC address. The first obtaining module 903 is configured to obtain, according to the source MAC address and the target MAC address that are carried in the network packet received by the first receiving module 902, and by querying the correspondence between each virtual machine MAC address and the security domain that is obtained by the first policy obtaining module 901, a security domain to which the source virtual machine corresponds and a security domain to which the target virtual machine corresponds. The first sending control module 904 is configured to, when the security domain to which the source virtual machine corresponds and which is obtained by the first obtaining module 903 is different from a security domain corresponding to the virtual bridge, control the virtual bridge to discard the network packet.

Figure 10:
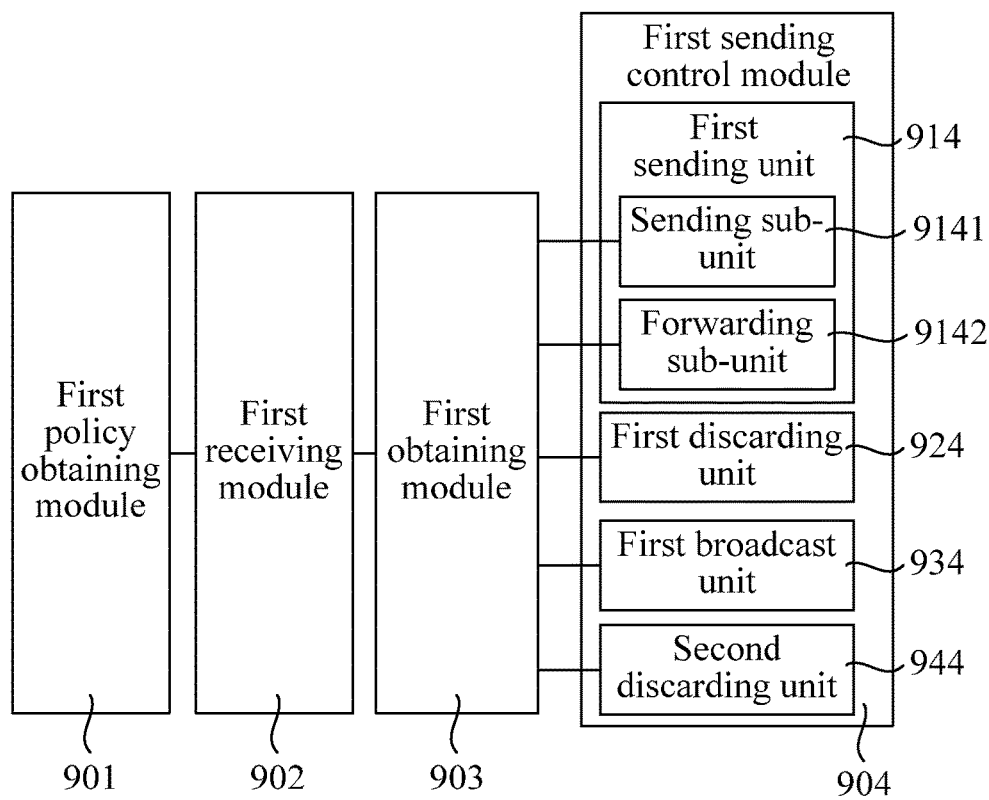
FIG. 10 is a schematic structural diagram of a second embodiment of an apparatus for processing a packet according to the present invention.

FIG. 10 is a schematic structural diagram of a second embodiment of an apparatus for processing a packet according to the present invention. As shown in FIG. 10, this embodiment provides an apparatus for processing a packet, which can perform steps of the method in the third or the fourth embodiment, so the details are not described herein again. In the apparatus for processing a packet provided by this embodiment, on the basis of the apparatus shown in FIG. 9, the first sending control module 904 may include a first sending unit 914 and a first discarding unit 924. The first sending unit 914 is configured to, when the target MAC address is a non-broadcast address, if the security domain to which the source virtual machine corresponds and which is obtained by the first obtaining module 903 is the same as the security domain corresponding to the virtual bridge, and the security domain to which the target virtual machine corresponds and which is obtained by the first obtaining module 903 is the same as the security domain corresponding to the virtual bridge, control the virtual bridge to send the network packet according to the target MAC address. The first discarding unit 924 is configured to, when the target MAC address is a non-broadcast address, if the security domain to which the source virtual machine corresponds and which is obtained by the first obtaining module 903 is different from the security domain corresponding to the virtual bridge, or the security domain to which the target virtual machine corresponds and which is obtained by the first obtaining module 903 is different from the security domain corresponding to the virtual bridge, control the virtual bridge to discard the network packet.

Further, the first sending unit 914 in this embodiment may include a sending sub-unit 9141 and a forwarding sub-unit 9142. The sending sub-unit 9141 is configured to, when the target MAC address is a non-broadcast address, if the security domain to which the source virtual machine corresponds and which is obtained by the first obtaining module 903 is the same as the security domain corresponding to the virtual bridge, the security domain to which the target virtual machine corresponds and which is obtained by the first obtaining module 903 is also the same as the security domain corresponding to the virtual bridge, and a physical host in which the target virtual machine is located and a physical host in which the source virtual machine is located are the same, control the virtual bridge to send the network packet to the target virtual machine in the physical host according to the target MAC address. The forwarding sub-unit 9142 is configured to, when the target virtual machine and the source virtual machine are not located in the same physical host, control the virtual bridge to send the network packet to a physical switch, where the physical switch forwards the network packet.

In this embodiment, the first sending control module 904 may include a first broadcast unit 934 and a second discarding unit 944. The first broadcast unit 934 is configured to, when the target MAC address is a broadcast address, if the security domain to which the source virtual machine corresponds and which is obtained by the first obtaining module 903 is the same as the security domain corresponding to the virtual bridge, control the virtual bridge to broadcast the network packet in a local area network through a physical switch. The second discarding unit 944 is configured to, when the target MAC address is a broadcast address, if the security domain to which the source virtual machine corresponds and which is obtained by the first obtaining module 903 is different from the security domain corresponding to the virtual bridge, control the virtual bridge to discard the network packet.

This embodiment provides an apparatus for processing a packet, where a physical host receives, through a virtual bridge, a network packet sent by a source virtual machine to a target virtual machine; obtains, according to a source MAC address and a target MAC address by querying correspondence between a virtual machine MAC address and a security domain, a security domain to which the source virtual machine corresponds and a security domain to which the target virtual machine corresponds; and controls the virtual bridge to discard the network packet, when the security domain to which the source virtual machine corresponds is different from a security domain corresponding to the virtual bridge. In this embodiment, filtering control on the network packet is implemented through the virtual bridge, and it is not required to send all traffic between virtual machines to a physical switch for processing, thereby greatly easing the burden of the physical switch and improving communication efficiency of a virtual network.

Figure 11:
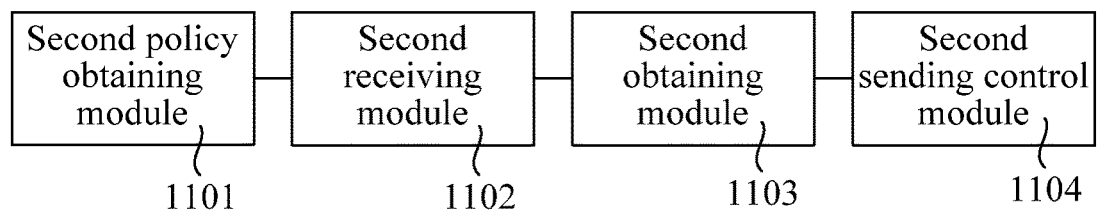
FIG. 11 is a schematic structural diagram of a third embodiment of an apparatus for processing a packet according to the present invention.

FIG. 11 is a schematic structural diagram of a third embodiment of an apparatus for processing a packet according to the present invention. As shown in FIG. 11, this embodiment provides an apparatus for processing a packet, which can perform steps of the method in the second embodiment, so the details are not described herein again. The apparatus for processing a packet provided by this embodiment may include a second policy obtaining module 1101, a second receiving module 1102, a second obtaining module 1103, and a second sending control module 1104. The second policy obtaining module 1101 is configured to obtain correspondence between each virtual machine MAC address and a security domain. The second receiving module 1102 is configured to receive, through a virtual bridge in a physical host, a network packet forwarded by a physical switch, where the network packet is sent to a target virtual machine in the physical host by a source virtual machine in another physical host, and carries a source MAC address and a target MAC address. The second obtaining module 1103 is configured to obtain, according to the source MAC address and the target MAC address that are carried in the network packet received by the second receiving module 1102, and by querying the correspondence between each virtual machine MAC address and the security domain that is obtained by the second policy obtaining module 1101, a security domain to which the source virtual machine corresponds and a security domain to which the target virtual machine corresponds. The second sending control module 1104 is configured to, when the security domain to which the source virtual machine corresponds and which is obtained by the second obtaining module 1103 is different from a security domain corresponding to the virtual bridge, control the virtual bridge to discard the network packet.

Figure 12:
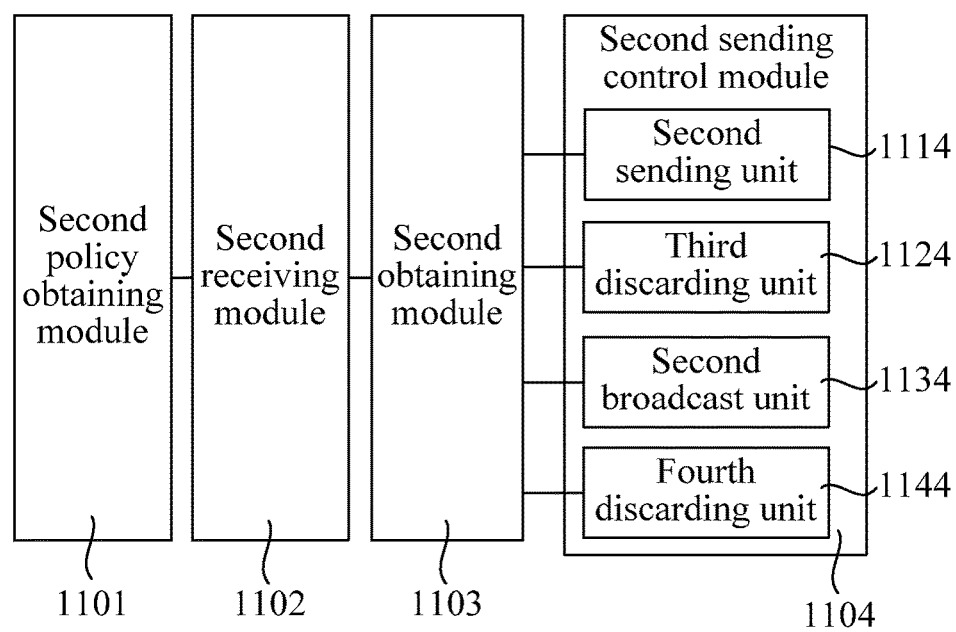
FIG. 12 is a schematic structural diagram of a fourth embodiment of an apparatus for processing a packet according to the present invention.

FIG. 12 is a schematic structural diagram of a fourth embodiment of an apparatus for processing a packet according to the present invention. As shown in FIG. 12, this embodiment provides an apparatus for processing a packet, which can perform steps of the method in the third or the fourth embodiment, so the details are not described herein again. In the apparatus for processing a packet provided by this embodiment, on the basis of the apparatus shown in FIG. 11, the second sending control module 1104 may include a second sending unit 1114 and a third discarding unit 1124. The second sending unit 1114 is configured to, when the target MAC address is a non-broadcast address, if the security domain to which the source virtual machine corresponds and which is obtained by the second obtaining module 1103 is the same as the security domain corresponding to the virtual bridge, and the security domain to which the target virtual machine corresponds and which is obtained by the second obtaining module 1103 is the same as the security domain corresponding to the virtual bridge, control the virtual bridge to send the network packet to the target virtual machine in the physical host according to the target MAC address. The third discarding unit 1124 is configured to, when the target MAC address is a non-broadcast address, if the security domain to which the source virtual machine corresponds and which is obtained by the second obtaining module 1103 is different from the security domain corresponding to the virtual bridge, or the security domain to which the target virtual machine corresponds and which is obtained by the second obtaining module 1103 is different from the security domain corresponding to the virtual bridge, control the virtual bridge to discard the network packet.

Alternatively, the second sending control module 1104 may include a second broadcast unit 1134 and a fourth discarding unit 1144. The second broadcast unit 1134 is configured to, when the target MAC address is a broadcast address, if the security domain corresponding to the virtual bridge that is obtained by the second obtaining module 1103 is the same as the security domain to which the source virtual machine corresponds, control the virtual bridge to forward the network packet to all virtual machines mapped onto the virtual bridge. The fourth discarding unit 1144 is configured to, when the target MAC address is a broadcast address, if the security domain corresponding to the virtual bridge that is obtained by the second obtaining module 1103 is different from the security domain to which the source virtual machine corresponds, control the virtual bridge to discard the network packet.

This embodiment provides an apparatus for processing a packet, where a physical host receives, through a virtual bridge, a network packet sent by a source virtual machine to a target virtual machine and forwarded by a physical switch, obtains, according to a MAC group policy, a source MAC address and a target MAC address, a security domain to which the source virtual machine corresponds and a security domain to which the target virtual machine corresponds respectively, and performs sending control processing on the network packet according to the security domain to which the source virtual machine corresponds and the security domain to which the target virtual machine corresponds. In this embodiment, filtering control on the network packet is implemented through the virtual bridge, and it is not required to send all traffic between virtual machines to the physical switch for processing, thereby greatly easing the burden of the physical switch and improving communication efficiency of a virtual network.

Figure 13:
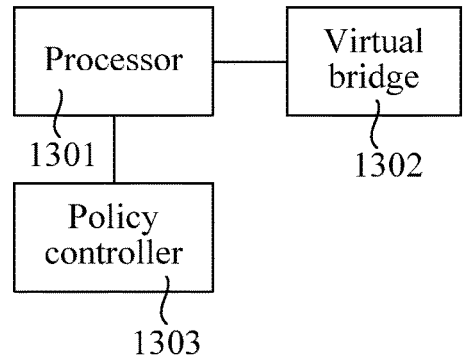
FIG. 13 is a schematic structural diagram of a first embodiment of a host according to the present invention.

FIG. 13 is a schematic structural diagram of a first embodiment of a host according to the present invention. As shown in FIG. 13, this embodiment provides a source host, which can perform steps of the method in the third or the fourth embodiment, so the details are not described herein again. The source host may include a processor 1301, and may further include a virtual bridge 1302 and a policy controller 1303. The policy controller 1303 is configured to obtain correspondence between each virtual machine MAC address and a security domain from a policy server in a network where the policy controller is located. The virtual bridge 1302 is configured to receive a network packet sent by a source virtual machine in the host, where the network packet carries a source MAC address and a target MAC address. The processor 1301 is configured to obtain, according to the source MAC address and the target MAC address by querying the correspondence between each virtual machine MAC address and the security domain that is obtained by the policy controller 1303, a security domain to which the source virtual machine corresponds and a security domain to which a target virtual machine corresponds; and control the virtual bridge to discard the network packet, when the security domain to which the source virtual machine corresponds is different from a security domain corresponding to the virtual bridge 1302.

The processor 1301 in this embodiment is configured to obtain, according to the source MAC address and the target MAC address by querying the correspondence between each virtual machine MAC address and the security domain that is obtained by the policy controller 1303, the security domain to which the source virtual machine corresponds and the security domain to which the target virtual machine corresponds; when the target MAC address is a non-broadcast address, if the security domain to which the source virtual machine corresponds is the same as the security domain corresponding to the virtual bridge 1302 and the security domain to which the target virtual machine corresponds is also the same as the security domain corresponding to the virtual bridge 1302, control the virtual bridge 1302 to send the network packet according to the target MAC address; and if the security domain to which the source virtual machine corresponds is different from the security domain corresponding to the virtual bridge 1302, or the security domain to which the target virtual machine corresponds is different from the security domain corresponding to the virtual bridge 1302, control the virtual bridge 1302 to discard the network packet.

The processor 1301 in this embodiment is configured to obtain, according to the source MAC address and the target MAC address by querying the correspondence between each virtual machine MAC address and the security domain that is obtained by the policy controller 1303, the security domain to which the source virtual machine corresponds and the security domain to which the target virtual machine corresponds; when the target MAC address is a broadcast address, if the security domain to which the source virtual machine corresponds is the same as the security domain corresponding to the virtual bridge 1302, control the virtual bridge 1302 to broadcast the network packet in a local area network through a physical switch; and if the security domain to which the source virtual machine corresponds is different from the security domain corresponding to the virtual bridge 1302, control the virtual bridge 1302 to discard the network packet.

This embodiment provides a source host, where the source host receives, through a virtual bridge, a network packet sent by a source virtual machine to a target virtual machine; obtains, according to a source MAC address and a target MAC address by querying correspondence between each virtual machine MAC address and a security domain, a security domain to which a source virtual machine corresponds and a security domain to which a target virtual machine corresponds; and controls the virtual bridge to discard the network packet, when the security domain to which the source virtual machine corresponds is different from a security domain corresponding to the virtual bridge. In this embodiment, filtering control on the network packet is implemented through the virtual bridge, and it is not required to send all traffic between virtual machines to a physical switch for processing, thereby greatly easing the burden of the physical switch and improving communication efficiency of a virtual network.

Figure 14:
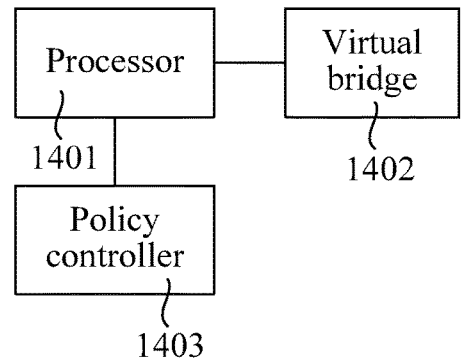
FIG. 14 is a schematic structural diagram of a second embodiment of a host according to the present invention.

FIG. 14 is a schematic structural diagram of a second embodiment of a host according to the present invention. As shown in FIG. 14, this embodiment provides a target host, which can perform steps of the method in the third or the fourth embodiment, so the details are not described herein again. The target host may include a processor 1401, and may further include a virtual bridge 1402 and a policy controller 1403. The policy controller 1403 is configured to obtain correspondence between each virtual machine MAC address and a security domain from a policy server in a network where the policy controller is located. The virtual bridge 1402 is configured to receive a network packet forwarded by a physical switch, where the network packet is sent to a target virtual machine in the physical host by a source virtual machine in another physical host, and carries a source MAC address and a target MAC address. The processor 1401 is configured to obtain, according to the source MAC address and the target MAC address by querying the correspondence between each virtual machine MAC address and the security domain that is obtained by the policy controller 1403, a security domain to which the source virtual machine corresponds and a security domain to which the target virtual machine corresponds; and control the virtual bridge 1402 to discard the network packet, when the security domain to which the source virtual machine corresponds is different from a security domain corresponding to the virtual bridge 1402.

The processor 1401 in this embodiment is configured to obtain, according to the source MAC address and the target MAC address by querying the correspondence between each virtual machine MAC address and the security domain, the security domain to which the source virtual machine corresponds and the security domain to which the target virtual machine corresponds; when the target MAC address is a non-broadcast address, if the security domain to which the source virtual machine corresponds is the same as the security domain corresponding to the virtual bridge 1402 and the security domain to which the target virtual machine corresponds is also the same as the security domain corresponding to the virtual bridge 1402, control the virtual bridge 1402 to send the network packet to the target virtual machine according to the target MAC address; and if the security domain to which the source virtual machine corresponds is different from the security domain corresponding to the virtual bridge 1402, or the security domain to which the target virtual machine corresponds is different from the security domain corresponding to the virtual bridge 1402, control the virtual bridge 1402 to discard the network packet.

The processor 1401 in this embodiment is configured to obtain, according to the source MAC address and the target MAC address by querying the correspondence between each virtual machine MAC address and the security domain, the security domain to which the source virtual machine corresponds and the security domain to which the target virtual machine corresponds; when the target MAC address is a broadcast address, if the security domain to which the source virtual machine corresponds is the same as the security domain corresponding to the virtual bridge 1402, control the virtual bridge 1402 to forward the network packet to all virtual machines mapped onto the virtual bridge; and if the security domain to which the source virtual machine corresponds is different from the security domain corresponding to the virtual bridge, control the virtual bridge 1402 to discard the network packet.

This embodiment provides a target host, where the target host receives, through a virtual bridge, a network packet sent by a source virtual machine to a target virtual machine; obtains, according to a source MAC address and a target MAC address by querying correspondence between each virtual machine MAC address and a security domain, a security domain to which the source virtual machine corresponds and a security domain to which the target virtual machine corresponds; and controls the virtual bridge to discard the network packet, when the security domain to which the source virtual machine corresponds is different from a security domain corresponding to the virtual bridge. In this embodiment, filtering control on the network packet is implemented through the virtual bridge, and it is not required to send all traffic between virtual machines to a physical switch for processing, thereby greatly easing the burden of the physical switch and improving communication efficiency of a virtual network.

Figure 15:
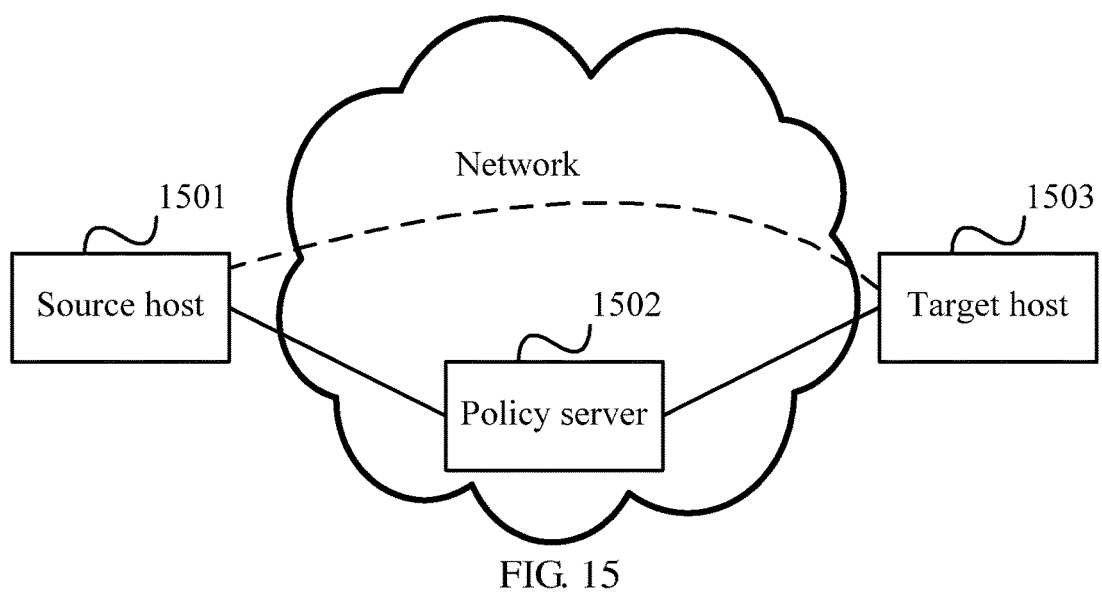
FIG. 15 is a schematic structural diagram of an embodiment of a network system according to the present invention.

FIG. 15 is a schematic structural diagram of an embodiment of a network system according to the present invention. As shown in FIG. 15, this embodiment provides a network system, which may include a source host 1501, a target host 1503, and a policy server 1502. The source host 1501 may be shown in FIG. 13, the target host 1503 is shown in FIG. 14, and the policy server 1502 is configured to provide correspondence between each virtual machine MAC address and a security domain for a policy controller in the source host 1501 or the target host 1503. The policy server 1502 may receive, through a policy controller in each source host 1501 or each target host 1503, a MAC group policy reported by each host, and enable, when required, one host to share a MAC packet group in another host through a policy controller.

The policy server 1502 in this embodiment is further configured to receive a MAC group policy of the source host or the target host that is reported by the source host 1501 or the target host 1503 through the policy controller, where the MAC group policy includes correspondence between each virtual machine MAC address and a security domain; and update, according to the MAC group policy, local correspondence between each virtual machine MAC address and a security domain in a local area network.

Finally, it should be noted that the foregoing embodiments are merely intended for describing the technical solutions of the present invention, other than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof; such modifications or replacements do not make essence of corresponding technical solutions depart from the scope of the technical solutions of the embodiments of the present invention.

What is claimed is:

1. A method for processing a network packet, the method comprising:
 setting, by a processor of a physical host, a virtual bridge in the physical host to a first security domain;
 transmitting, by the processor of the physical host, the network packet from a source virtual machine running in the physical host to the virtual bridge, wherein a target media access control (MAC) address field of the network packet carries a target MAC address and a source MAC address field of the network packet carries a MAC address of the source virtual machine;
 querying, by the processor of the physical host, a mapping relationship stored in a memory of the physical host for a second security domain that corresponds to the MAC address of the source virtual machine, wherein the mapping relationship comprises multiple virtual machine MAC addresses that each correspond to a respective security domain; and
 instructing, by the processor of the physical host, the virtual bridge to discard the network packet when the second security domain that corresponds to the MAC address of the source virtual machine is different from the first security domain that corresponds to the virtual bridge.

2. The method according to claim 1, further comprising:
  querying, by the processor of the physical host, the mapping relationship for a third security domain that corresponds to the target MAC address; and
  instructing, by the processor of the physical host, the virtual bridge to discard the network packet when the target MAC address is a non-broadcast address and the third security domain that corresponds to the target MAC address is different from the first security domain that corresponds to the virtual bridge.

3. The method according to claim 1 further comprising:
  querying, by the processor of the physical host, the mapping relationship for a third security domain that corresponds to the target MAC address; and
  instructing, by the processor of the physical host, the virtual bridge to send the network packet according to the target MAC address when the target MAC address is a non-broadcast address, the second security domain that corresponds to the MAC address of the source virtual machine is the same as the first security domain that corresponds to the virtual bridge, and the third security domain that corresponds to the target MAC address is also the same as the first security domain that corresponds to the virtual bridge.

4. The method according to claim 3, wherein instructing the virtual bridge to send the network packet according to the target MAC address comprises:
  instructing, by the processor of the physical host, the virtual bridge to send the network packet to a target virtual machine based on the target MAC address without using a physical switch when the target virtual machine runs in the physical host; and
  instructing, by the processor of the physical host, the virtual bridge to forward the network packet to the physical switch based on the target MAC address when the target virtual machine runs in another physical host, wherein the physical switch further forwards the network packet according to the target MAC address.

5. The method according to claim wherein before querying the mapping relationship stored in the memory of the physical host for the second security domain that corresponds to the MAC address of the source virtual machine, the method further comprises:
  reporting, by the processor of the physical host, a first MAC group policy to a policy server in a network where the physical host is located, wherein the first MAC group policy comprises a correspondence between the MAC address of the source virtual machine and the second security domain;
  receiving, by the processor of the physical host, a second MAC group policy from the policy server in the network where the physical host is located, wherein the second MAC group policy comprises the correspondence between a MAC address of another virtual machine currently running on another physical host in the network and a third security domain, and wherein the second MAC group policy is integrated by the policy server according to the report of the other physical host; and
  obtaining, by the processor of the physical host, the mapping relationship from the first MAC group policy and the second MAC group policy.

6. The method according to claim 5, wherein after reporting the first MAC group policy to the policy server, the method further comprises reporting a changed MAC group policy to the policy server to enable the policy server to update the second MAC group policy when the physical host detects that the first MAC group policy is changed.

7. The method according to claim 1 further comprising, instructing, by the processor of the physical host, the virtual bridge to broadcast the network packet in a local area network through a physical switch that is communicatively coupled to the physical host when the target MAC address is a broadcast address and the second security domain that corresponds to the MAC address of the source virtual machine is same as the first security domain that corresponds to the virtual bridge.

8. A method for processing a network packet, the method comprising:
  setting, by a processor of a physical host, a virtual bridge in the physical host to a first security domain;
  receiving, by the network interface of the physical host, the network packet from a source virtual machine running in another physical host, wherein a source media access control (MAC) address field of the network packet carries a MAC address of the source virtual machine;
  transmitting, by a processor of the physical host, the network packet from the network interface to the virtual bridge;
  querying, by the processor of the physical host, a mapping relationship stored in a memory of the physical host for a second security domain that corresponds to the MAC address of the source virtual machine, wherein the mapping relationship comprises multiple virtual machine MAC addresses that each correspond to a respective security domain; and
  instructing, by the processor of the physical host, the virtual bridge to discard the network packet when the second security domain that corresponds to the MAC address of the source virtual machine is different from the first security domain that corresponds to the virtual bridge.

9. The method according to claim 8, further comprising:
  querying, by the processor of the physical host, the mapping relationship for a third security domain that corresponds to a target MAC address, wherein the target MAC address is carried in a target MAC address field of the network packet; and
  instructing, by the processor of the physical host, the virtual bridge to discard the network packet when the target MAC address is a non-broadcast address and the third security domain that corresponds to the target MAC address is different from the first security domain that corresponds to the virtual bridge.

10. The method according to claim 8 further comprising:
  querying, by the processor of the physical host, the mapping relationship for a third security domain that corresponds to a target MAC address, wherein the target MAC address is carried in a target MAC address field of the network packet; and
  instructing, by the processor of the physical host, the virtual bridge to send the network packet to a target virtual machine running in the physical host based on the target MAC address when the target MAC address is a non-broadcast address, the second security domain that corresponds to the MAC address of the source virtual machine is the same as the first security domain that corresponds to the virtual bridge, and the third security domain that corresponds to the target MAC address is also the same as the first security domain that corresponds to the virtual bridge.

11. The method according to claim 8 further comprising instructing, by the processor of the physical host, the virtual bridge to forward the network packet to all virtual machines mapped onto the virtual bridge when a target MAC address is a broadcast address and the second security domain that corresponds to the MAC address of the source virtual machine is same as the first security domain that corresponds to the virtual bridge.

12. A physical host for processing a network packet comprising:
   a memory configured to store instructions; and
   a processor coupled to the memory and configured to execute the instructions stored in the memory to:
   set a virtual bridge in the physical host to a first security domain;
   transmit the network packet from a source virtual machine running in the physical host to the virtual bridge, wherein a target media access control (MAC) address field of the network packet carries a target MAC address and a source MAC address field of the network packet carries a MAC address of the source virtual machine;
   query a mapping relationship stored in the memory of the physical host for a second security domain that corresponds to the MAC address of the source virtual machine, wherein the mapping relationship comprises multiple virtual machine MAC addresses that each correspond to a respective security domain; and
   instruct the virtual bridge to discard the network packet when the second security domain that corresponds to the MAC address of the source virtual machine is different from the first security domain that corresponds to the virtual bridge.

13. The apparatus according to claim 12, wherein the processor is further configured to:
   query the mapping relationship for a third security domain that corresponds to the target MAC address; and
   instruct the virtual bridge to send the network packet according to the target MAC address when the target MAC address is a non-broadcast address, the second security domain that corresponds to the MAC address of the source virtual machine is the same as the first security domain that corresponds to the virtual bridge, and the third security domain that corresponds to the target MAC address is also the same as the first security domain that corresponds to the virtual bridge.

14. The apparatus according to claim wherein the processor is further configured to:
   query the mapping relationship for a third security domain that corresponds to the target MAC address;
   instruct the virtual bridge to discard the network packet when the target MAC address is a non-broadcast address and the third security domain that corresponds to the target MAC address is different from the first security domain that corresponds to the virtual bridge.

15. The apparatus according to claim 13, wherein the processor, when instructing the virtual bridge to send the network packet according to the target MAC address when the target MAC address is the non-broadcast address, is further configured to:
   instruct the virtual bridge to send the network packet to a target virtual machine based on the target MAC address without using a physical switch that is communicatively coupled to the physical host when the target virtual machine runs on the physical host; and
   instruct the virtual bridge to forward the network packet to the physical switch based on the target MAC address when the target virtual machine runs in another physical host, wherein the physical switch further forwards the network packet according to the target MAC address.

16. The apparatus according to claim 12, wherein the processor is configured to instruct the virtual bridge to broadcast the network packet in a local area network through a physical switch that is communicatively coupled to the physical host when the target MAC address is a broadcast address, and the second security domain that corresponds to the MAC address of the source virtual machine is the same as the first security domain that corresponds-to the virtual bridge.

17. A physical host for processing a network packet comprising:
   a network interface configured to receive the network packet from a source virtual machine running in another physical host, wherein a source media access control (MAC) address field of the network packet carries a MAC address of the source virtual machine;
   a memory configured to store instructions; and
   a processor coupled to the memory and configured to execute the instructions stored in the memory to:
   set a virtual bridge in the physical host to a first security domain;
   transmit the network packet received by the network interface to the virtual bridge;
   query a mapping relationship stored in the memory of the physical host for a second security domain that corresponds to the MAC address of the source virtual machine, wherein the mapping relationship comprises multiple virtual machine MAC addresses that each correspond to a respective security domain; and
   instruct the virtual bridge to discard the network packet when the second security domain that corresponds to the MAC address of the source virtual machine is different from the first security domain that corresponds to the virtual bridge.

18. The apparatus according to claim 17, wherein the processor is further configured to:
   query the mapping relationship for a third security domain that corresponds to a target MAC address, wherein the target MAC address is carried in a target MAC address field of the network packet; and
   instruct the virtual bridge to send the network packet to a target virtual machine in the physical host based on the target MAC address when the target MAC address is a non-broadcast address, the second security domain that corresponds to the MAC address of the source virtual machine is the same as the first security domain that corresponds to the virtual bridge, and the third security domain that corresponds to the target MAC address is also the same as the first security domain that corresponds to the virtual bridge.

19. The apparatus according to claim 17, wherein the processor is further configured to:
   query the mapping relationship for a third security domain that corresponds to a target MAC address, wherein the target MAC address is carried in a target MAC address field of the network packet; and
   instruct the virtual bridge to discard the network packet when the target MAC address is a non-broadcast address and the third security domain that corresponds to the target MAC address-is different from the first security domain that corresponds to the virtual bridge.

20. The apparatus according to claim 17, wherein the processor is further configured to instruct the virtual bridge to forward the network packet to all virtual machines mapped onto the virtual bridge when the target MAC address is a broadcast address, and the second security domain that corresponds to the MAC address of the source machine is the same as the first security domain that corresponds to the virtual bridge.

* * * * *

UNITED STATES PATENT AND TRADEMARK OFFICE
CERTIFICATE OF CORRECTION

PATENT NO.         : 9,634,991 B2
APPLICATION NO.    : 14/575592
DATED              : April 25, 2017
INVENTOR(S)        : Yuchen Wang et al.

It is certified that error appears in the above-identified patent and that said Letters Patent is hereby corrected as shown below:

In the Claims

Column 35, Line 47, Claim 14 should read:

The apparatus according to claim 12, wherein the processor is further configured to:
query the mapping relationship for a third security domain that corresponds to the target MAC address;
instruct the virtual bridge to discard the network packet when the target MAC address is a non-broadcast address and the third security domain that corresponds to the target MAC address is different from the first security domain that corresponds to the virtual bridge.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*